United States Patent
Gaeta et al.

(10) Patent No.: US 10,484,824 B1
(45) Date of Patent: Nov. 19, 2019

(54) CONTENT PRESENTATION AND LAYERING ACROSS MULTIPLE DEVICES

(71) Applicant: Lucasfilm Entertainment Company Ltd., San Francisco, CA (US)

(72) Inventors: John Gaeta, San Francisco, CA (US); Michael Koperwas, San Francisco, CA (US); Nicholas Rasmussen, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 15/194,094

(22) Filed: Jun. 27, 2016

Related U.S. Application Data

(60) Provisional application No. 62/185,422, filed on Jun. 26, 2015, provisional application No. 62/232,985, filed on Sep. 25, 2015, provisional application No. 62/291,648, filed on Feb. 5, 2016.

(51) Int. Cl.

| | | |
|---|---|---|
| *G06T 19/00* | (2011.01) | |
| *G06T 3/00* | (2006.01) | |
| *H04W 4/02* | (2018.01) | |
| *H04B 1/3827* | (2015.01) | |
| *H04M 1/725* | (2006.01) | |

(52) U.S. Cl.
CPC ............ *H04W 4/026* (2013.01); *H04B 1/385* (2013.01); *H04M 1/72527* (2013.01)

(58) Field of Classification Search
CPC .......... G06F 3/011; G06F 3/147; G06F 17/50; G09G 2320/0261; G09G 2380/02; G09G 2360/18; G06K 2009/363; G06K 2209/01; G02B 27/017; H04R 19/02; H04R 2201/401; G06T 13/20; G06T 2210/22; G06T 19/006; G06T 19/20; G06T 3/00–608
USPC .......................................................... 345/633
See application file for complete search history.

(56) References Cited

U.S. PATENT DOCUMENTS

| | | | | |
|---|---|---|---|---|
| 2004/0036844 | A1* | 2/2004 | Wood | G06T 5/006 353/70 |
| 2006/0038965 | A1* | 2/2006 | Hennes | G03B 21/26 353/94 |
| 2008/0246694 | A1 | 10/2008 | Fischer | |
| 2010/0142928 | A1 | 6/2010 | Rohde | |
| 2011/0007069 | A1 | 1/2011 | Lee | |

(Continued)

OTHER PUBLICATIONS

"Automatic Keystone Correction for Camera-assisted Presentation Interfaces", Sukthankar et al., 2000, Advances in Multimodal Interfaces—Proceedings of ICMI 2000, pp. 1-8.*

(Continued)

*Primary Examiner* — Phong X Nguyen
(74) *Attorney, Agent, or Firm* — Kilpatrick Townsend & Stockton LLP

(57) ABSTRACT

A method may include causing first content to be displayed on a display device. The method may also include determining a location of a mobile device relative to the display device. In some embodiments, the mobile device may be positioned such that the first content is visible to a viewer of the mobile device. The method may additionally include causing second content to be displayed on the mobile device such that the second content is layered over the first content.

20 Claims, 27 Drawing Sheets

(56) References Cited

U.S. PATENT DOCUMENTS

| | | | |
|---|---|---|---|
| 2011/0187706 A1 | 8/2011 | Vesely et al. | |
| 2012/0127284 A1* | 5/2012 | Bar-Zeev | G02B 27/017 348/53 |
| 2012/0326948 A1* | 12/2012 | Crocco | G09G 5/00 345/7 |
| 2013/0328762 A1* | 12/2013 | McCulloch | G02B 27/017 345/156 |
| 2014/0198096 A1 | 7/2014 | Mitchell | |
| 2014/0364212 A1 | 12/2014 | Osman et al. | |
| 2015/0070391 A1 | 3/2015 | Nishimaki et al. | |
| 2015/0178967 A1* | 6/2015 | Kruglick | G06T 11/00 345/625 |
| 2015/0350628 A1 | 12/2015 | Sanders et al. | |
| 2016/0035140 A1 | 2/2016 | Bickerstaff et al. | |
| 2016/0037849 A1* | 2/2016 | Shearman | A42B 3/0426 2/424 |
| 2016/0182877 A1* | 6/2016 | Deluca | H04N 13/0007 348/53 |
| 2016/0379417 A1 | 12/2016 | Mount et al. | |

OTHER PUBLICATIONS

"Keystone Error Correction Method in Camera-Projector System to Correct the Projected Image on planar surface and tilted projector", Yadav et al., 2013, International Journal of Computer Science & Engineering Technology (IJCSET), vol. 4, No. 02, pp. 142-146.*

"Method of achieving a wide field-of-view head-mounted display with small distortion", Yang et al., 2013, Optical Society of America, vol. 38, No. 12, pp. 2035-2037.*

U.S. Appl. No. 15/289,858, "Final Office Action", dated Mar. 2, 2018, 9 pages.

U.S. Appl. No. 15/289,858, "Non-Final Office Action", dated Sep. 21, 2017, 10 pages.

U.S. Appl. No. 15/289,858, "Notice of Allowance", dated May 15, 2018, 11 pages.

* cited by examiner

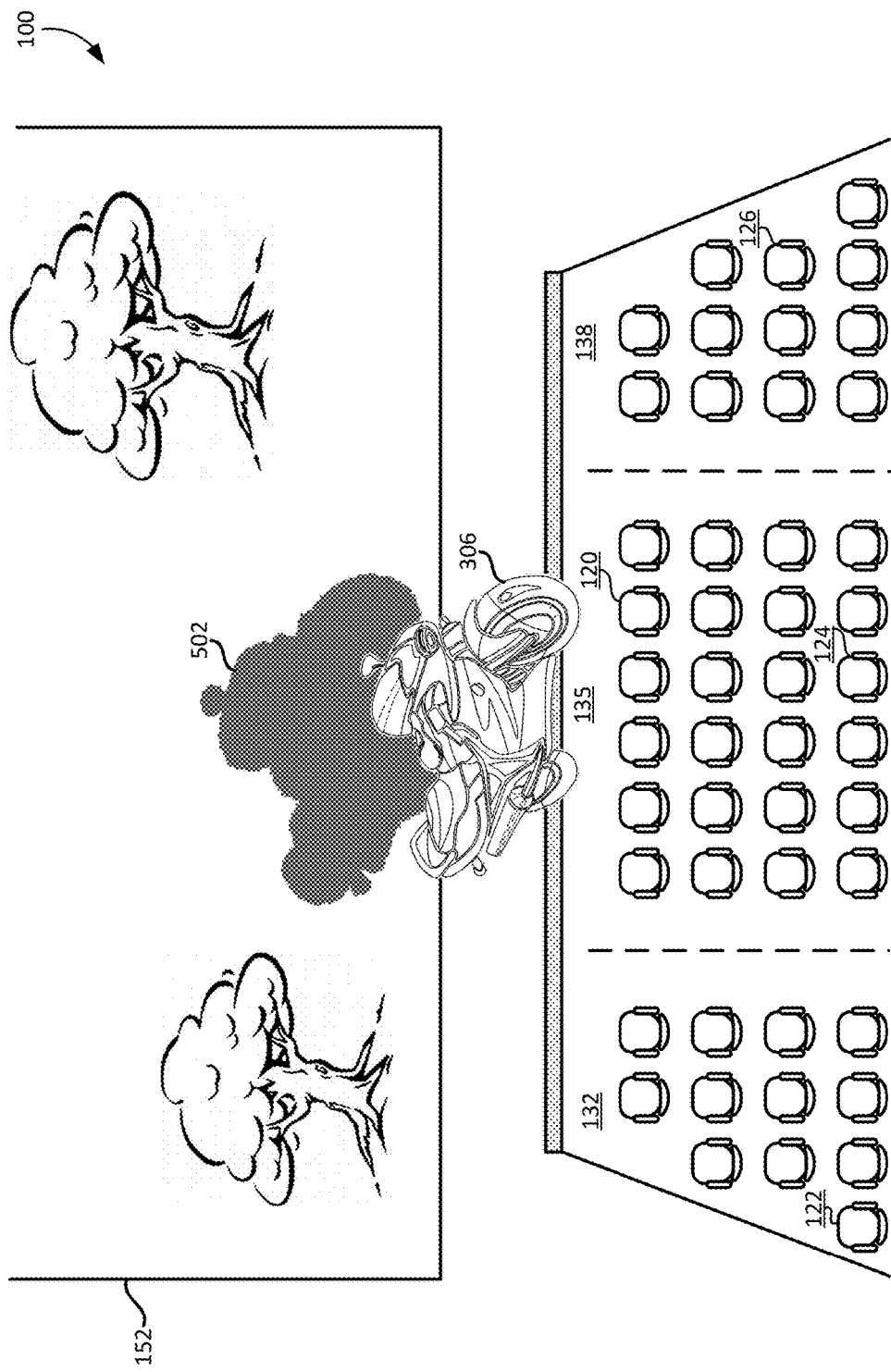

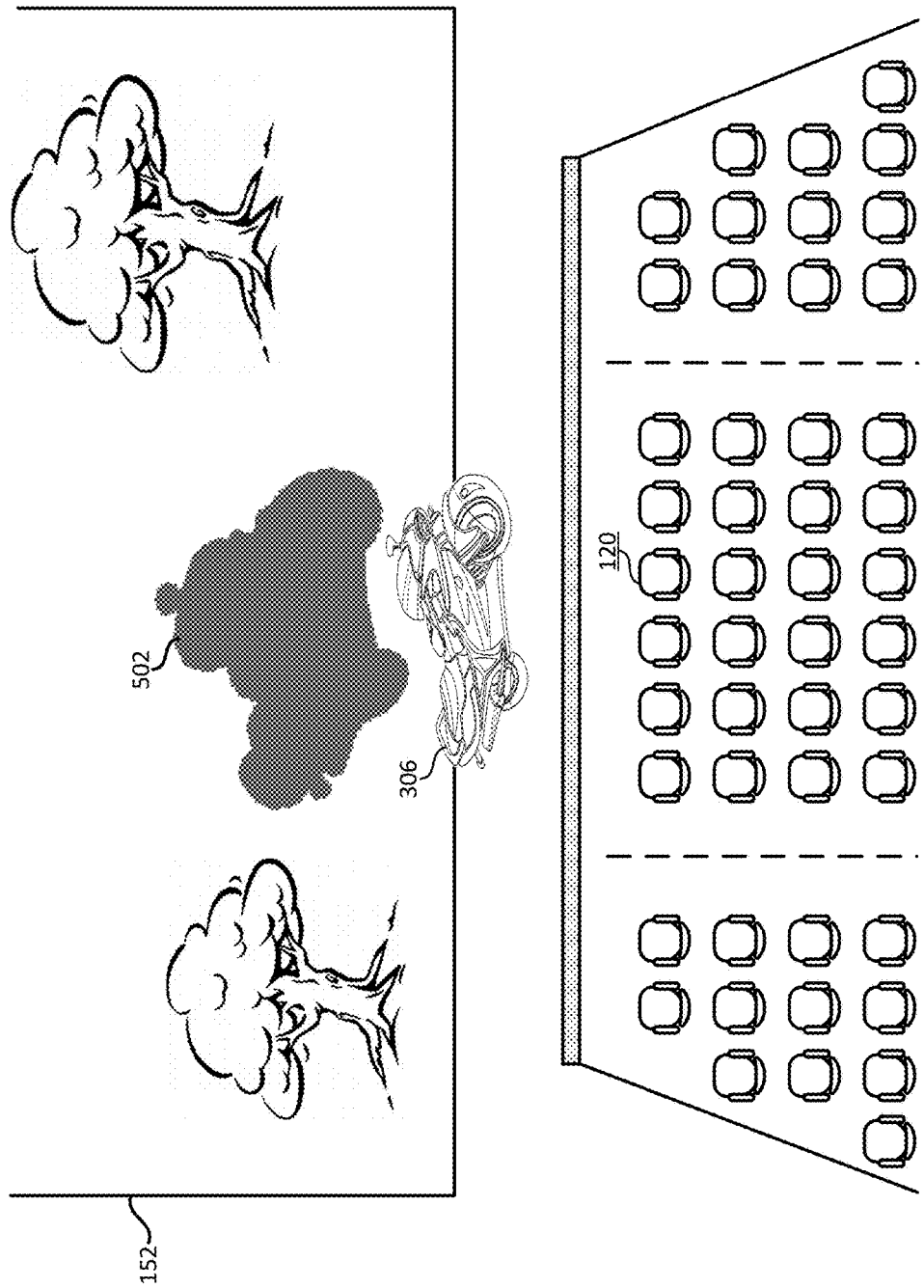

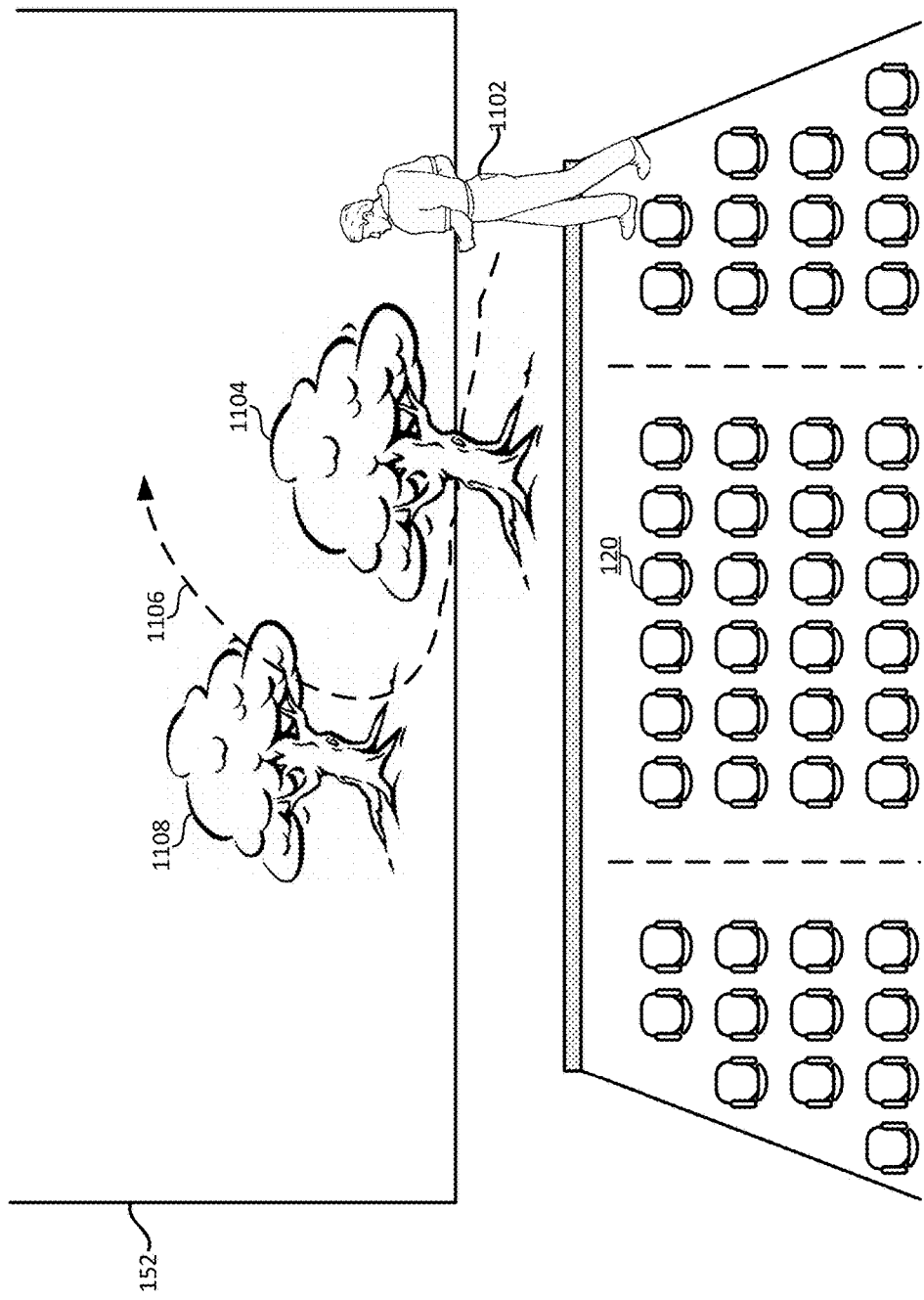

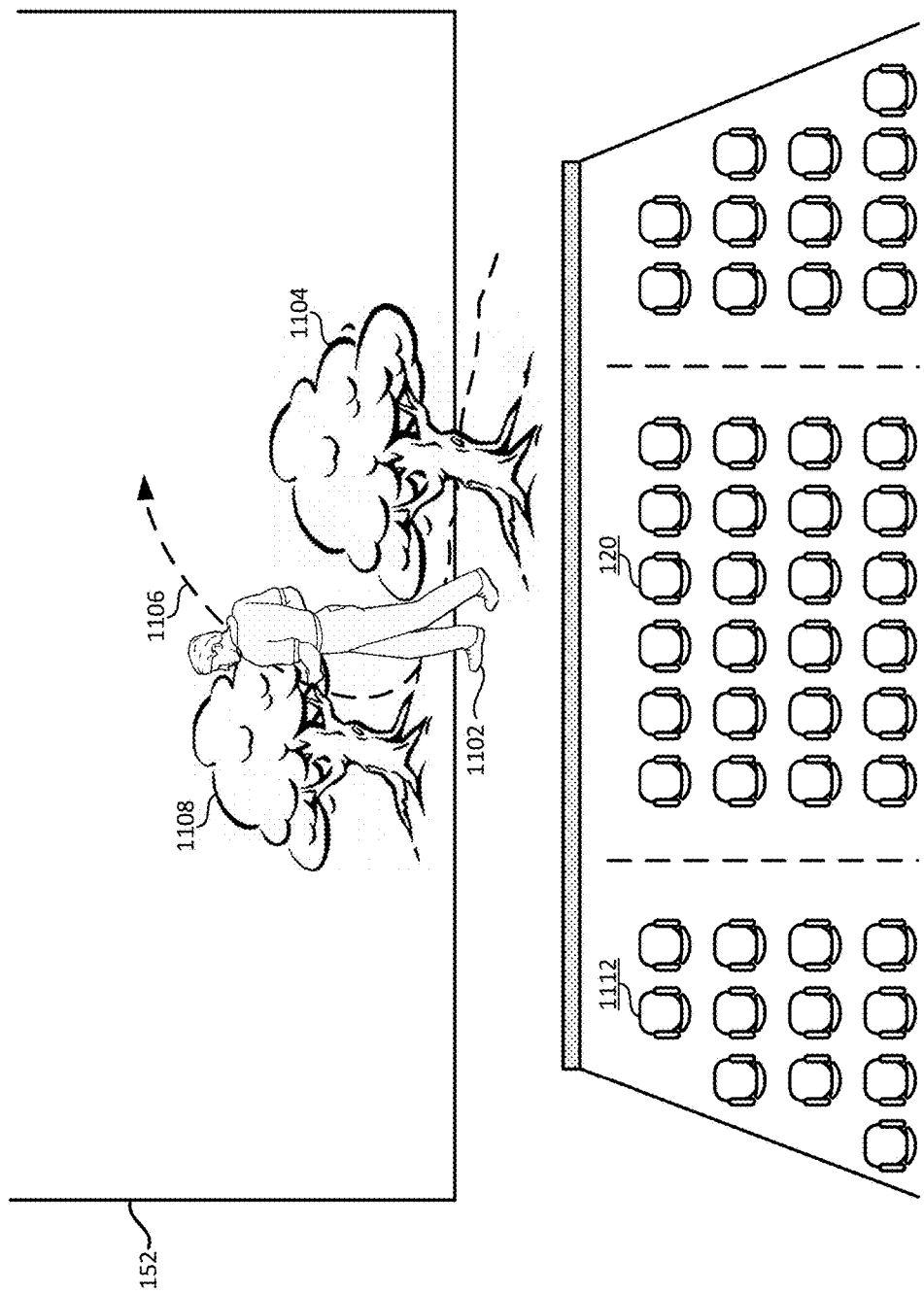

CONTENT PRESENTATION AND LAYERING ACROSS MULTIPLE DEVICES

CROSS REFERENCES

This application claims the benefit of the following U.S. Provisional Applications:

U.S. Provisional Application No. 62/185,422, filed on Jun. 26, 2015, entitled "INTERACTING WITH AN IMMERSIVE ENVIRONMENT," by Johnston et al, which is incorporated herein by reference.

U.S. Provisional Application No. 62/232,985, filed on Sep. 25, 2015, entitled "CONTENT PRESENTATION AND LAYERING ACROSS MULTIPLE DEVICES," by Koperwas et al, which is incorporated herein by reference.

U.S. Provisional Application No. 62/291,648, filed on Feb. 5, 2016, entitled "CONTENT PRESENTATION AND LAYERING ACROSS MULTIPLE DEVICES," by Koperwas et al, which is incorporated herein by reference.

BACKGROUND

Augmented reality includes a live view of a real-world environment that is augmented by computer generated sensory input(s), such as GPS graphics, video, sound, data statistics, and so forth. In contrast to virtual reality, which replaces the real-world environment with a simulated one, augmented reality elements are often displayed in real time in semantic context with elements of the real-world environment. For example, sports scores can be displayed on a television during a basketball game on a same screen. Headmounted displays can also be used to place the virtual images over a view of the physical world such that both are in the user's field of view.

BRIEF SUMMARY

In some embodiments, a computer-implemented method may include causing first content to be displayed on a display device. The method may also include determining a location of a mobile device relative to the display device. In some embodiments, the mobile device may be positioned such that the first content is visible to a viewer of the mobile device. The method may additionally include causing second content to be displayed on the mobile device such that the second content is layered over the first content.

In some embodiments, a non-transitory, computer-readable medium may include instructions that, when executed by one or more processors, cause the one or more processors to perform operations including causing first content to be displayed on a display device. The operations may also include determining a location of a mobile device relative to the display device. In some embodiments, the mobile device may be positioned such that the first content is visible to a viewer of the mobile device. The operations may additionally include causing second content to be displayed on the mobile device such that the second content is layered over the first content.

In some embodiments, a system may include one or more processors and one or more memory devices. The one or more memory devices may include instructions that, when executed by the one or more processors, cause the one or more processors to perform operations including causing first content to be displayed on a display device. The method may also include determining a location of a mobile device relative to the display device. In some embodiments, the mobile device may be positioned such that the first content is visible to a viewer of the mobile device. The method may additionally include causing second content to be displayed on the mobile device such that the second content is layered over the first content.

In any of the embodiments described herein, one more of the following features may be included in any combination and without limitation. The method/operations may also include determining dimensions of the display device, and generating or altering a displayed size of the second content based at least in part on the dimensions of the display device and the location of the mobile device. The method/operations may also include determining an orientation of the mobile device relative to the display device, and generating or altering the second content based at least in part on the orientation of the mobile device. The mobile device may include a pair of augmented-reality (AR) glasses worn by the viewer, the display device may include a theater screen in a movie theater, and the first content may include a movie. A blur effect may be applied to the first content, and the blur effect need not be applied to the second content. The method/operations may additionally include determining a location of a second mobile device relative to the display device, where the second mobile device may be positioned such that the first content is visible to a viewer of the second mobile device, and causing third content to be displayed on the second mobile device such that the third content is layered over the first content. The second content may include an object, the third content may include the object, when viewed through the mobile device, the object may appear at a first location relative to the display device, and when viewed through the second mobile device, the object may appear at the first location relative to the display device. Alternatively, when viewed through the second mobile device, the object may appear at a second location relative to the display device, where the second location relative to the display device is different from the first location relative to the display device. The second content may include an object following a first motion path, the third content may include the object following a second motion path, the first motion path may be different from the second motion path relative to the display device, and the first motion path when viewed through the mobile device may be the same as the second motion path when viewed through the second mobile device. The method/operations may also include receiving a first input from the mobile device, and receiving a second input from the second mobile device, where the second input may be received after the first input is received, the object may begin following the first motion path based on when the first input is received, and the object may begin following the second motion path based on when the second input is received.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 5A illustrates an image displayed on the mobile device that is attached to the screen and consistent across viewing locations, according to some embodiments.

FIG. 10A illustrates how content displayed on the mobile device can be compressed in depth based on a distance to the screen 152, according to some embodiments.

FIG. 11A illustrates how a dynamic compositing operation can be used to have objects displayed by the mobile device interact with objects displayed on the screen, according to some embodiments.

FIG. 11C illustrates how the character is viewed differently at the same point in time from a different location in the viewing environment, according to some embodiments.

DETAILED DESCRIPTION

Figure 1A:
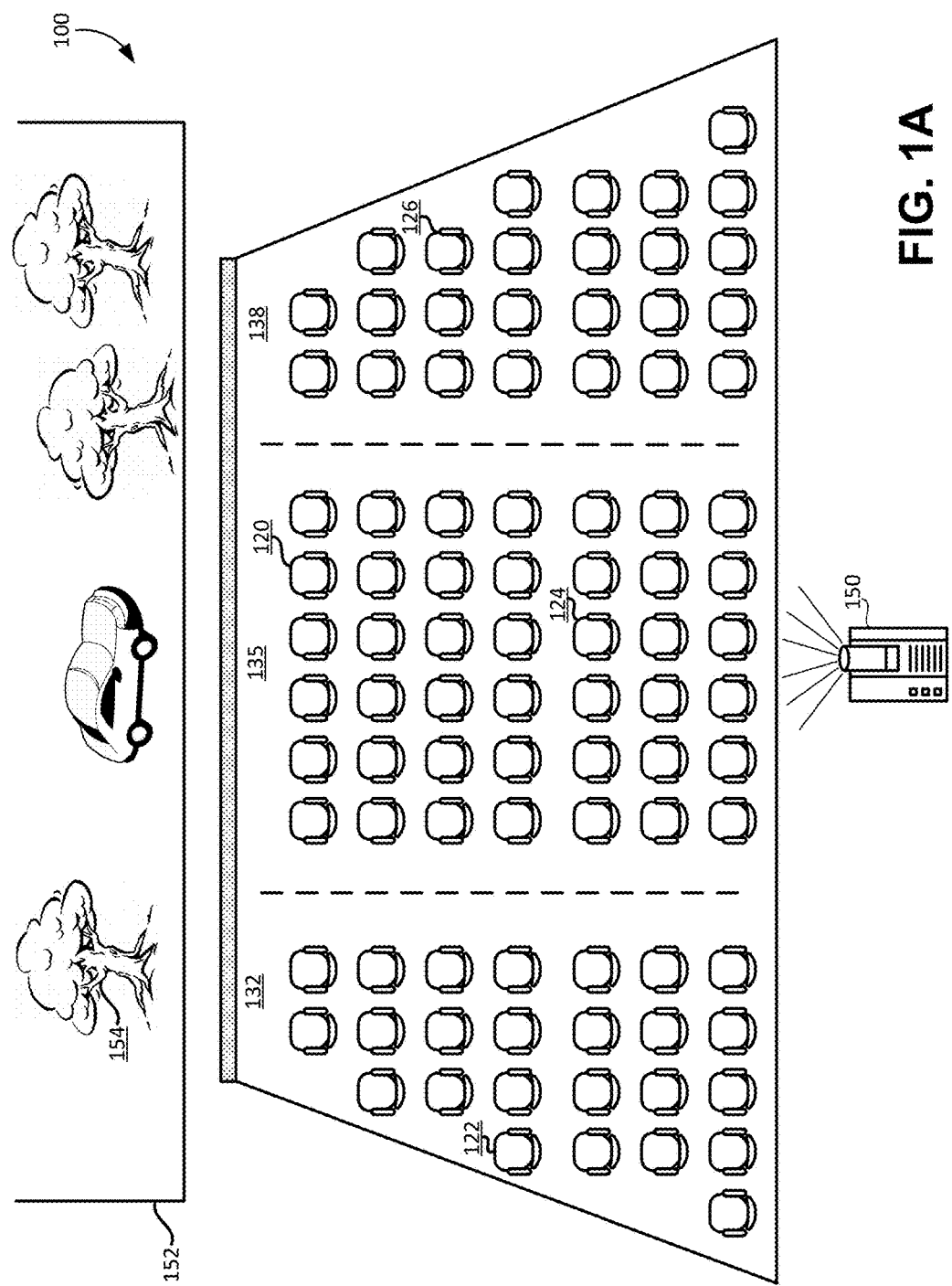
FIG. 1A illustrates an environment for presenting layered content across multiple devices, according to some embodiments.

Embodiments described herein may be directed at the integration and synchronization of content shown over a screen with additional content displayed via, for example, a pair of augmented-reality (AR) glasses. For example, a feature film may be presented over a typical movie screen. A pair of AR glasses worn by a viewer may simultaneously present additional content that augments the content presented over the screen. In this way, various visual effects and/or additional information may be conveyed to the viewer to enhance the viewer's experience. Illustratively, a pitcher may be shown as throwing a baseball in a movie presented over a screen. At some point, the baseball may "pop-out" of the screen by being transitioned for display over AR glasses worn by a viewer.

In some embodiments, a display system manages the integration and synchronization of content presented over a screen with additional content presented via a pair of AR glasses. In one aspect, the presentation system automatically tracks the location of every pair of AR glasses within an viewing environment. Specifically, the AR glasses may include one or more sensors and/or communication devices, such as GPS sensors, WiFi, bluetooth, cameras, visual markers, etc. The sensors/communication devices may be used to track the locations of each viewer within the auditorium. The presentation system and/or each pair of AR glasses may further automatically determine the real and/or viewer relative dimensions of the screen in the auditorium.

Based on the locations of each pair of AR glasses and the screen dimensions, the presentation system determines how the additional content for each individual pair of AR glasses is to be presented to a corresponding viewer. Specifically, the positioning, orientation, size, and other features of the additional content may be automatically adjusted so that the additional content can be correctly integrated with the content presented over the screen for each viewer. Other viewers wearing other AR glasses may have the additional content be adjusted differently since they may be sitting at different locations within the auditorium.

As an example, an auditorium may be divided into multiple logical zones. The presentation system may indicate to a pair of AR glasses to present the additional content based on the zone in which the AR glasses are located. For instance, if a viewer were located at a logical zone on the right side of the auditorium, the presentation system may have the additional content presented to the viewer in a manner that compensates for the fact that the viewer is at the right side of the auditorium. Illustratively, the additional content may be placed in a particular position based on the fact that the viewer is located in the logical zone on the right side of the auditorium. The additional content may be placed at a different position for viewers located in other logical zones.

As another example, the AR glasses may automatically use a built-in camera or some other sensor to determine the dimensions of the screen in an auditorium relative to the viewer wearing the AR glasses. Based on this determination, the AR glasses may present the additional content such that it is scaled based on the determined relative dimensions of the screen for the viewer. For instance, a first user in an auditorium may be presented the additional content at a scale of 90%. A second user in the auditorium who is further back (and thus the relative dimensions of the screen may be smaller) may be presented the additional content at a scale of 50%.

As still another example, the presentation system may automatically use information regarding the location of the AR glasses and the predefined real dimensions of the screen to scale the additional content, which it then provides to the AR glasses for presentation to the user. For example, based on the real dimensions of the screen and the location of the AR glasses, the presentation system can determine the dimensions of the screen relative to the viewer wearing the AR glasses. Based on this determination, the presentation system can scale the additional content so that it appears "correct" relative to the content presented over the screen.

In some aspects, the additional content may be automatically synchronized with the content presented over the screen. In some aspects, a camera or microphone built into the AR glasses may be used to trigger or signal when certain events are occurring in the feature film and cause certain portions of the additional content to be accordingly presented. In one aspect, the aforementioned triggering may be based on the matching of audio or image-based fingerprints. In other aspects, the presentation system may keep track of the run-time of the feature film. Based on the run-time, the presentation system may signal to the AR glasses when to present portions of the additional content.

Throughout the rest of this disclosure, a particular viewing environment will be used as an example. This viewing environment may be described as a traditional movie theater auditorium with a plurality of seats and a large screen at the front of the viewing area onto which a motion picture is projected. Each of the viewers seated in the auditorium may be equipped with a mobile device, such as the AR glasses described above. The mobile device can provide additional layered content that appears in an immersive and fluid fashion with the content projected on the screen. However, it will be understood that this particular viewing environment is merely used by way of example, and is not meant to be limiting. Other environments may also include a home with a television screen replacing the movie theater screen described below, and a tablet device, laptop device, mobile phone, and/or the like replacing the AR glasses described above. Therefore, throughout the remainder of this disclosure, any of the specific devices, arrangements, systems, or architectures that specifically refer to the theater environment may also be readily applied to a home viewing environment, or any other similar viewing environment, in any combination and without limitation.

FIG. 1A illustrates an environment 100 for presenting layered content across multiple devices, according to some embodiments. The environment 100 may include a display system and a mobile device. It should be appreciated that there may be additional components to the representative system. Additionally, certain components may not necessarily be required by the system. Components may also be combined. In one embodiment, each of the components in the system may be connected over a suitable connection. In certain embodiments, the components may be connected over the Internet or a local Intranet.

The display system may include devices suitable for projecting or displaying an item of content, such as a movie. The movie may include a digital animated film, a live-action film, a videogame, and/or any combination thereof. In some embodiments, the display system may include a projection device 150 and/or a screen 152. The projection device 150 may project an item of content onto the screen 152. In other embodiments, the screen 152 may include an active screen display, such as a television, an LCD television, a wall of LED screens, and/or the like. In still other embodiments, the display system may include a computer with a monitor, a tablet device, a smartphone, a watch, a portable DVD player, etc. For example, some embodiments may omit the projection device 150, and the screen 152 can actively display the item of content.

The mobile device may be a set of virtual reality or augmented reality glasses or goggles. The mobile device may also include portable screens, such as the smart phone, a tablet device, a watch, a laptop computer, and/or the like. In some embodiments, the mobile device may include a display or a mechanism for projecting images that are visible to a user. The display of the mobile device may be transparent or semi-transparent such that a user can also see through the display. The projection of images over the display of the mobile device may only obscure a portion of the field of view of the user. In this way, a user can view both the image displayed by the mobile device and at least a portion of the physical environment behind the display of the mobile device.

In some embodiments, the physical environment behind the display of the mobile device may include the screen 152. In these embodiments, the user can simultaneously view both an image displayed by the first mobile device and at least a portion of the display of the screen 152. The embodiments described herein layer content between the screen 152 and the mobile device in a seamless and interactive way, such that the user is provided with an immersive content experience that is unique based on their location in the environment 100.

In certain embodiments, the display system may load an item of content, such as a movie, and begin presenting the item of content to one or more users. Although not shown explicitly due to size constraints in FIG. 1A, each viewer sitting in the seats depicted in the environment 100 may be equipped with a mobile device. When referring to a specific viewer in a specific location in the environment 100, the mobile device used by that specific viewer may be referred to as the "first mobile device" or simply the "mobile device." For example, the environment 100 includes locations 120, 122, 124, and 126, each of which may include a user equipped with a mobile device. When referring specifically to the experience of a user sitting in location 120, the mobile device of the user in location 120 may be referred to as the "mobile device." When comparing the viewing experience of users in different locations, the respective mobile devices may be referred to as the "first mobile device" and the "second mobile device." Therefore, it will be understood that the terms "first" and "second" do not imply ordering, precedence, and/or preference. Instead, these terms are used merely to distinguish one mobile device from another mobile device.

Figure 1B:
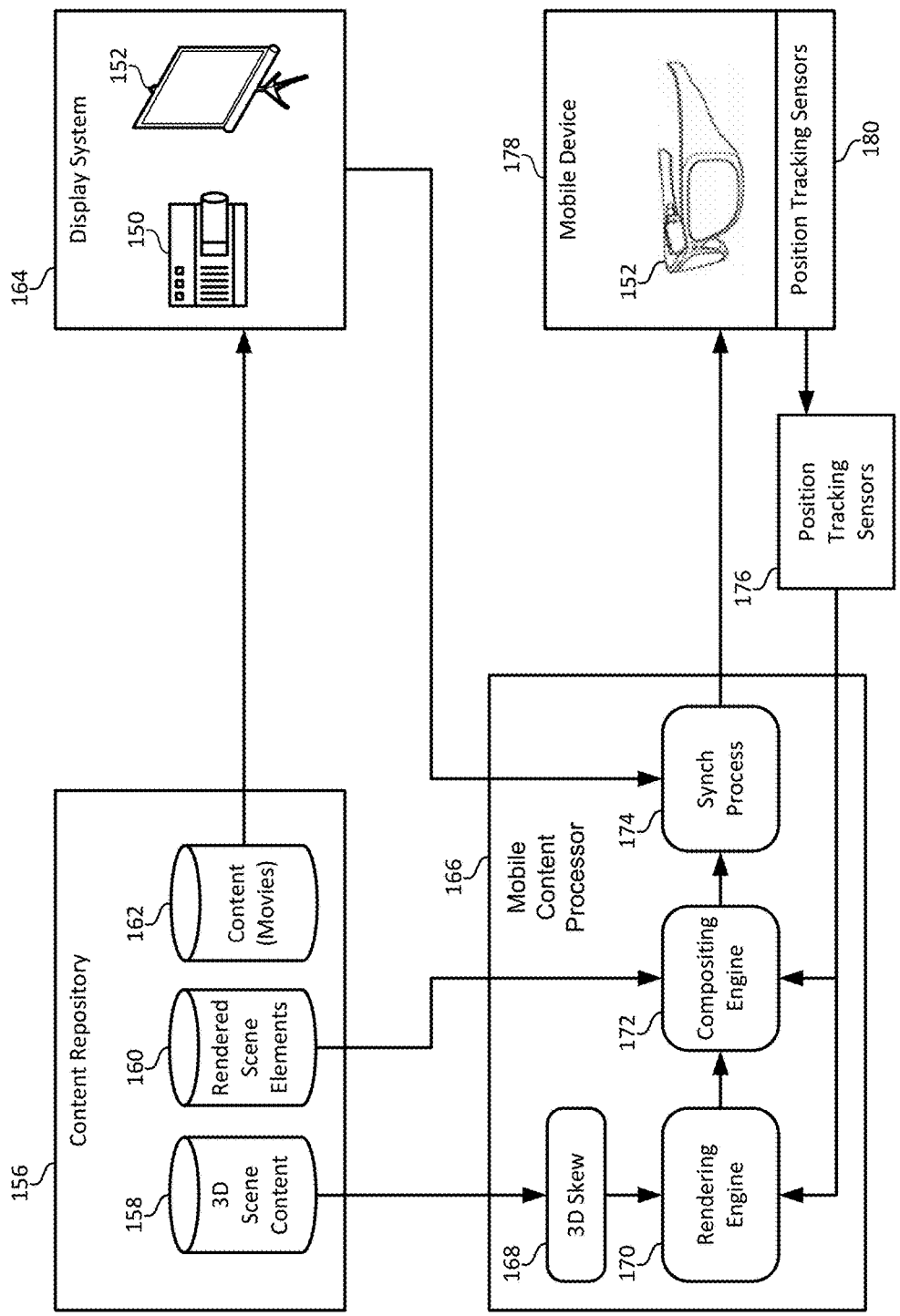
FIG. 1B illustrates a custom hardware/software system for generating and displaying layered content on multiple devices, according to some embodiments.

FIG. 1B illustrates a custom hardware/software system for generating and displaying layered content on multiple devices, according to some embodiments. The system may include a content repository 156 that includes one or more different types of content. First, the content repository 156 may include a content data store 162 that includes content to be displayed by the display system 164. In some embodiments, the content data store 162 may include full-length movies or complete media productions that can be displayed on the screen 152. The content data store 162 may include a plurality of two-dimensional (2-D) frames that can be sequentially displayed on the screen 152.

The system may also include a mobile device 178, such as a pair of augmented-reality glasses 152. The system may be configured to display additional content on the mobile device 178 during playback of the content in the content data store 162 on the screen 152. In some embodiments, a position and/or orientation of the mobile device 178 may be known and static, in that the position and orientation of the mobile device 178 is constant and unchanging during playback of the content from the content data store 162. In this case, the additional content to be displayed on the mobile device 178 can also be stored as a plurality of 2-D frames that are displayed on the mobile device 178. In these embodiments, no additional rendering or compositing may be necessary in order to display the additional content on the mobile device 178.

In some embodiments, the position and/or orientation of the mobile device 178 may be unknown and/or changing during playback of the content from the content data store 162. In these embodiments, the system can generate a sequence of 2-D frames to be displayed on the mobile device 178 that account for the position and/or orientation of the mobile device 178. In some cases, the approximate position of the mobile device 178 may be known, but the orientation of the mobile device 178 may be allowed to change dynamically. The content repository 156 may also include a rendered scene elements data store 162 that includes scene elements rendered from a particular approximate position of the mobile device 178. These rendered scene elements can be retrieved by a mobile content processor 166 and processed into a sequence of 2-D frames for display on a mobile device. The rendered scene elements can be inserted into a compositing engine 172 to be edited before being sent to the mobile device 178 for display. In some scenes, the rendered scene elements may interact with elements of the content from the content repository 162 currently being displayed on the screen 152. For example, a character or object being displayed on the mobile device 178 may pass behind an object being displayed on the screen 152. The compositing engine 172 can generate a matte or cut out that removes a portion of the rendered scene elements comprising the character or object as it passes behind the object displayed on screen 152. An example of this situation is described below in greater detail.

In the situation described above where a series of rendered, 2-D frames have been stored corresponding to a specific location in front of the screen 152, that set of 2-D frames can be used for all viewer locations position at that orientation from the screen 152, regardless of the distance from the screen (z-depth). However, while the same images may be reused, the distance from the screen can be used to scale, skew, and/or stretch each of these images based on distance from the screen. This may be done to compensate for the fact that an object displayed on the mobile device close to the screen will look very small, while the same object displayed at the same size on the mobile device far away from the screen will look very large in comparison to objects on the screen. Examples of this type of scaling are shown in greater detail in the examples given below.

The mobile content processor 166 may be co-implemented with the content repository 156, and may transmit the sequence of 2-D frames to the mobile device 178 after the sequence is generated. In other embodiments, the mobile content processor 166 may be integrated with the mobile device 178 such that each mobile device 178 in the environment 100 is able to process its own individual sequence of 2-D frames for display. In a theater with hundreds of viewers, pushing the mobile content processor 166 out to each of the individual mobile devices 178 can alleviate decentralized transmission and/or generation of 3-D images.

In some embodiments, the content to be displayed on the mobile device 178 may be generated in real time as the content from the content repository 162 is displayed on the screen 152. A 3-D scene content repository 158 can store animated sequences for a 3-D scene that can be rendered in real time for display on the mobile device 178. The mobile content processor 166 can accept an animation sequence comprising 3-D scene elements. Turning back briefly to FIG. 1A, a location where the viewer is sitting can be used as a position of a virtual camera in the 3-D virtual scene. The image plane for the rendered scene can be positioned directly in front of the 3-D virtual camera to correspond to the position of the screen/lens of the mobile device 178 in front of the viewer's eye. The content in the content repository 162 being displayed on the screen 152 may have been rendered from the same scene with the image plane positioned at the location of the screen 152 relative to the position of the mobile device 178 and the viewer. The position and/or orientation of the mobile device 178 can be tracked in real time and fed into the rendering engine 170 such that the position/orientation of the virtual camera and image plane can be updated in real-time. The rendering engine 170 can use the tracked position and the 3-D scene content in order to generate a rendered set of 2-D images for display a mobile device.

When the position of the mobile device 178 is directly in front of the screen 152, the rendered scene elements can be displayed without alteration on the mobile device 178. However, when the location of the mobile device 178 is to the left or right of the center of the screen 152, the rendered content may need to be skewed in order to match the apparent skew of the screen 152. For example, when the viewer is sitting in location 124 of the environment 100 of FIG. 1A, the rendered 3-D elements can be displayed on the mobile device 178 without alteration. However, when a viewer is sitting in location 126, the objects appearing on the screen 152 will appear skewed because of the viewing angle relative to the screen 152. To solve this problem, a skew operation 168 can be added to the mobile content processor 162 that uses the location of the mobile device 178 to skew the geometry of the 3-D elements before they are rendered by the rendering engine 170. Alternatively or additionally, stored 2-D images can be stretched or compressed in the direction of the required skew without performing another rendering operation. An example of this situation is described in greater detail later in this disclosure.

As the viewer is viewing the item of content while wearing the mobile device 178, the mobile device 178 may display additional content to augment the item of content displayed by the display system. This may require a synchronization process 174 to coordinate the timing of images displayed on the screen 152 and images displayed on the mobile device 178. For example, the mobile device 178 may be configured to detect when certain scenes or events are occurring within the content displayed on screen 152. In one embodiment, the mobile device 178 may detect such events by using a built in camera to match a currently displayed frame by the screen 152 with a predefined frame representative of the scene or event. In another embodiment, the mobile device 178 may detect such events by using a built in microphone to determine whether the audio currently being presented by the display system matches with a predefined audio representative of the scene or event. In yet another embodiment, a communication link between the display system and the mobile device 178 may be established. The display system may send a signal to the mobile device 178 via the communication link to indicate triggering or occurrence of a scene or event. If a match/event/scene is detected, the mobile device 178 may automatically present additional content associated with the scene or event. In some embodiments, the additional content may only be presented on a portion of the display of the mobile device 178. The remaining portion may be kept transparent so that a user can still view the content being displayed over the screen 152. In this way, the additional content presented by the mobile device 178 can appear to be layered over, overlaid, or composited with the content being displayed by the screen 152. As an illustrative example, a user may be viewing a movie showing a starship battle scene. When the particular scene is detected by the mobile device 178, the mobile device 178 may display a flying saucer that appears to interact with the content being displayed over the projection device 150. This may only be perceived by the user wearing the mobile device 178. Users who are not wearing mobile devices may not perceive the flying saucer or any additional content.

The mobile device 178 may include one or more position tracking sensors 180. In some embodiments, the sensors may include accelerometers, gyroscopes, GPS receivers, gravitation sensors, and/or digital compasses. The sensors can be used to determine a position and/or orientation of the mobile device 178 by measuring displacements from an initial, known position. For example, each mobile device in FIG. 1A could be assigned to a specific seat location in the environment 100. At the beginning of the movie, the viewer may be instructed to look directly at a symbol in the middle of the screen 152 to establish a known, initial orientation. From that point, the accelerometers and gyroscopes could be sampled to measure displacements from this initial position. These sensors, along with a gravitational sensor can be used to measure a change in orientation from the initial orientation.

In some embodiments, the tracking sensors 180 may include a radio transmitter and/or an RFID chip. Radio receivers can be positioned throughout the environment 100 and used to ping the RFID chip on the mobile device 178. These external radio receivers may be one of a plurality of position tracking sensors 176 that are distributed throughout the environment 100. By measuring the ping time for each mobile device of each of the position tracking sensors 178 of the environment 100, a position of the mobile device 178 can be triangulated. In some embodiments, the GPS receiver can be integrated into the mobile device 178 and used to determine a position of the mobile device 178. In some embodiments, the position tracking sensors 178 may include a plurality of cameras. The cameras may be configured to detect fiducial markers that are installed as part of the position tracking sensors 180 on the mobile device 178. For example, a graphic symbol resembling a QR code can be placed on the mobile device 178 and tracked by the cameras.

Figure 2:
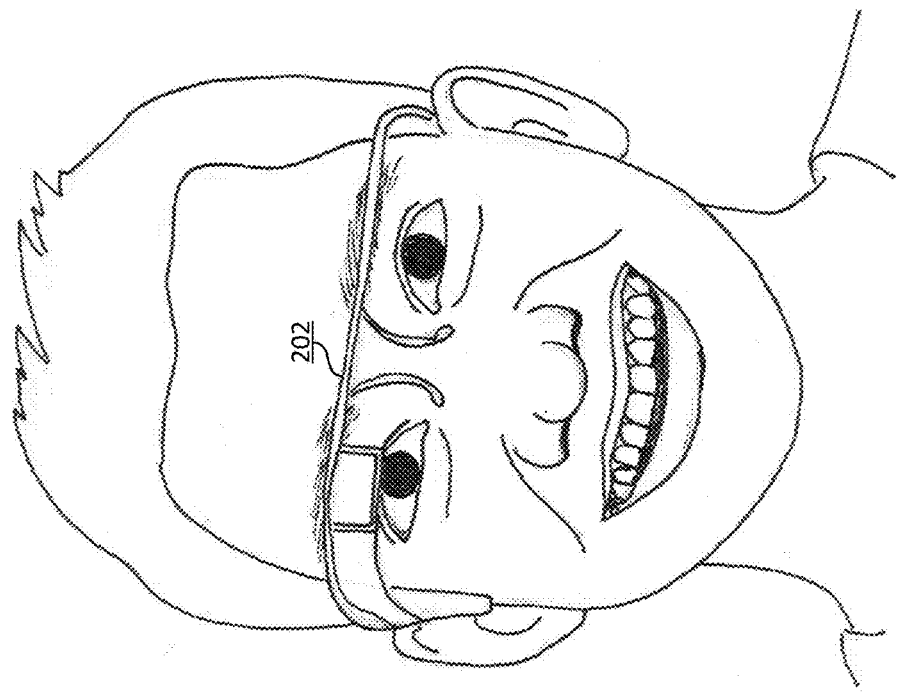
FIG. 2 illustrates examples of the first mobile device, according to some embodiments.
Figure 2:

FIG. 2 illustrates examples of a mobile device, according to some embodiments. In order to display content on the mobile device, the mobile device may be small enough that only a portion of the content displayed on the display system is obscured. In some embodiments, the mobile device may be transparent or semitransparent such that the content displayed by the display system is visible through the content displayed on the mobile device. In some embodiments, the mobile device may have a transparent display area that is transparent everywhere except where content is displayed by the mobile device.

In one specific example that may be used for illustrative purposes throughout this description, the mobile device may include an augmented-reality headset or virtual-reality headset (VR). A virtual-reality headset 202 may include a head-mounted device configured to provide an immersive virtual reality experience. It may include a stereoscopic head-mounted display providing separate images for each eye, along with head or motion tracking sensors. The sensors may include gyroscopes, accelerometers, structured light systems, and so forth. In some embodiments, the virtual-reality headset 202 may also include headphones, eye tracking sensors, and/or input controllers that may be accessed by a user.

In some embodiments, an augmented-reality (AR) headset 204 may include a head-mounted display that allows viewing of both images of the physical world and virtual objects that are projected by the augmented-reality headset into the user's field of view. In some embodiments, the augmented-reality headset may include eyeglasses, visors, goggles, or other devices resembling such. Some embodiments may include eyewear that employs cameras to intercept a real-world view that is redisplayed for the user. Embodiments that display a real-time real-world image for the viewer qualify as "transparent or semitransparent" for the purposes of this description. Other embodiments may include a heads up display, contact lenses, a virtual retina display, EyeTap® technology, and so forth. Like the virtual-reality headset 202, the augmented-reality headset 204 may include position-tracking devices, such as digital cameras, optical sensors, accelerometers, GPS receivers, gyroscopes, solid-state compasses, RFID chips, wireless sensors, and so forth, that track the location and/or orientation of a user's head. The augmented reality headset 204 may also include input devices, such as gesture recognition systems, touchpads, buttons, microphones, and/or sensors that are configured to interpret a user's body movements as inputs.

Figure 3A:
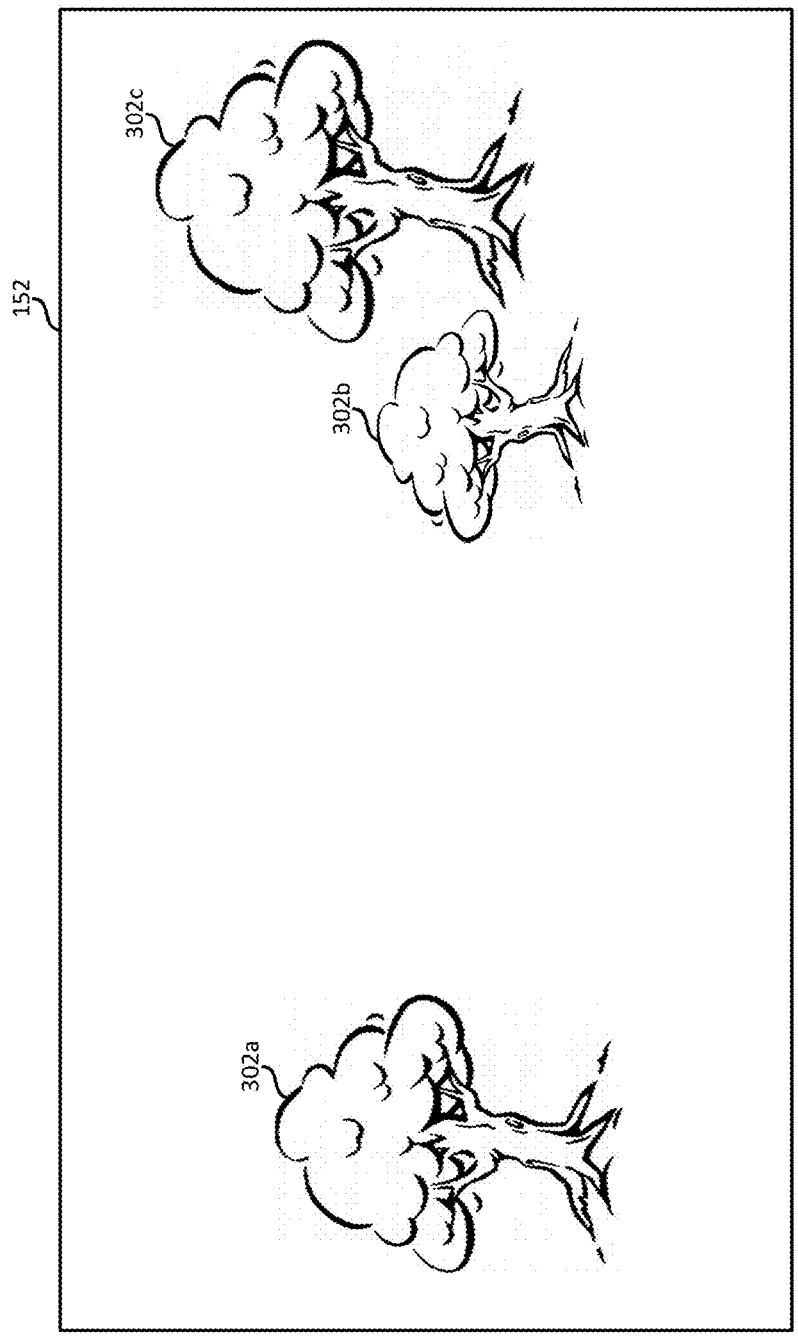
FIG. 3A illustrates a scene displayed by the display system in the absence of the first mobile device, according to some embodiments.

FIG. 3A illustrates a scene displayed by the display system in the absence of a mobile device, according to some embodiments. Specifically, a landscape is displayed by the display system as seen by a user who is not wearing a mobile device (e.g., set of VR/AR goggles). The screen 152 illustrates a plurality of trees 302 as part of the landscape. In some embodiments, it may not be readily apparent to a viewer that any object is missing from the landscape displayed by the display system. This can be used to ensure that viewers that are not equipped with a compatible mobile device are still able to enjoy the content displayed by the display system.

Figure 3B:
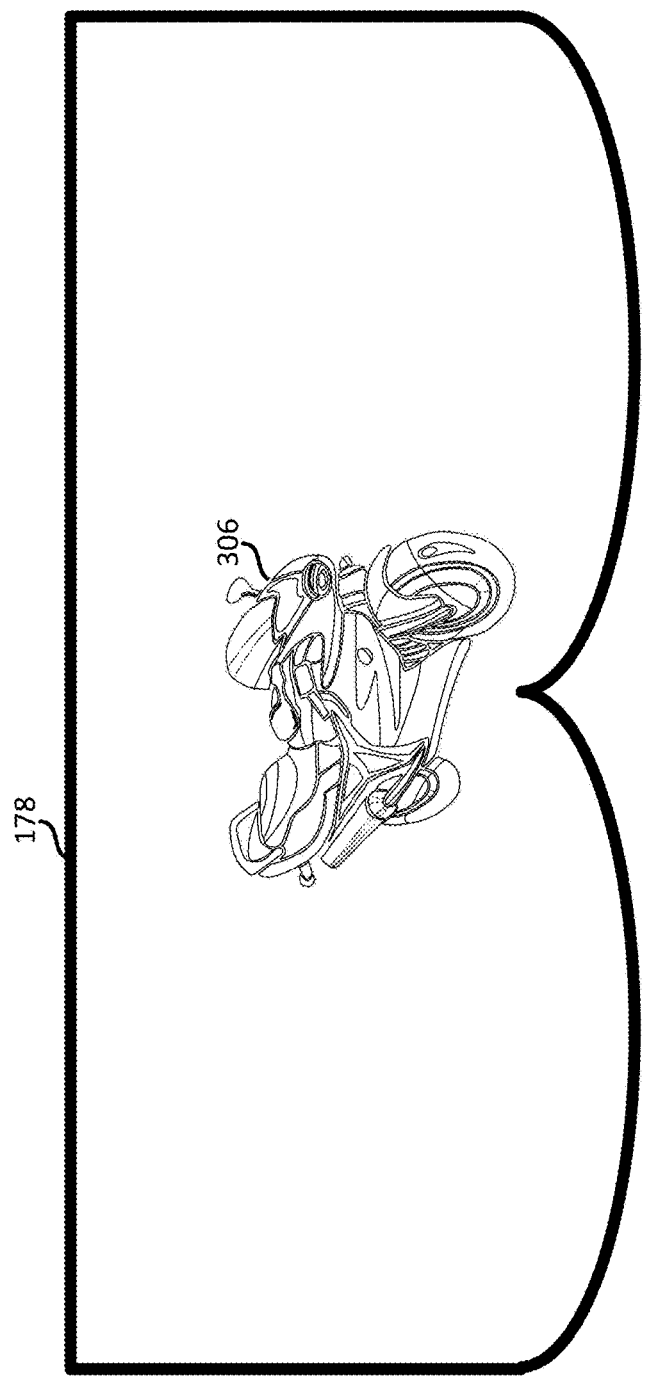
FIG. 3B illustrates the same scene displayed by the mobile device in the absence of display system, according to some embodiments.

FIG. 3B illustrates the same scene displayed by the mobile device 178 in the absence of the display system, according to some embodiments. Specifically, the same landscape displayed by the display system is viewed through the mobile device 178. The representation of the mobile device 178 in FIG. 3B represents the view of a user looking through the mobile device 178. For example, FIG. 3B may represent a user looking through the view of a pair of augmented-reality glasses. As can be seen, the mobile device 178 displays a motorcycle 306. Also, the mobile device 178 does not display any of the background scene elements, such as the plurality of trees 302 that are part of the landscape displayed by the display device in FIG. 3A. As with the display device, some embodiments can present content in such a way that the content can still be enjoyed using the mobile device 178 in the absence of the display system.

Figure 3C:
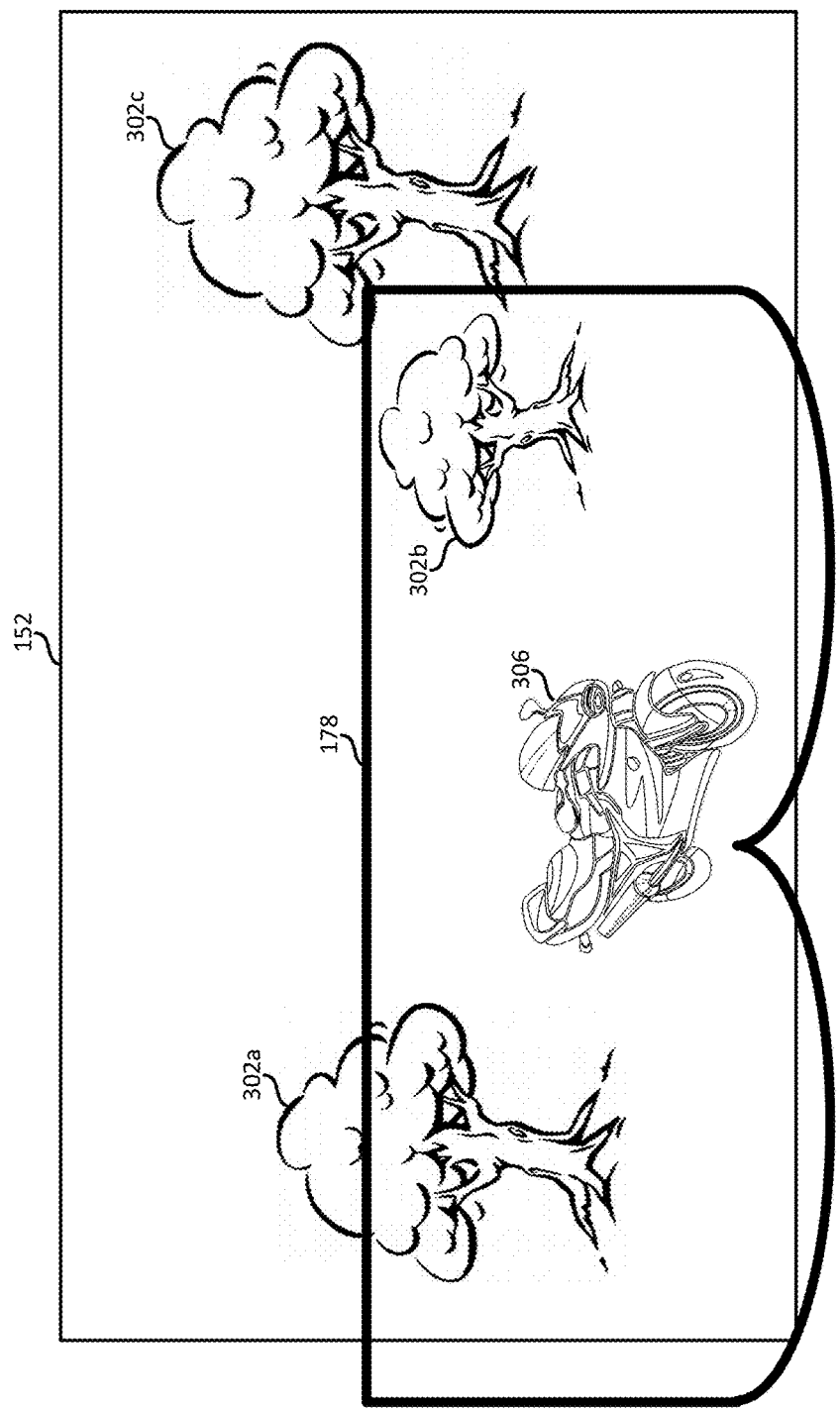
FIG. 3C illustrates the same scene displayed by the mobile device with the display system, according to some embodiments.

FIG. 3C illustrates the same scene displayed by the mobile device 178 with the display system, according to some embodiments. Specifically, the landscape, including the plurality of trees 302, continues to be displayed by the display device. The display of the mobile device 178 is transparent such that the plurality of trees 302 is still visible to a viewer who is looking through the mobile device 178. The motorcycle 306 displayed by the mobile device 178 is now layered on top of the landscape displayed by the display system. In some embodiments, the motorcycle 306 can blend seamlessly in with the other elements of the landscape displayed by the display device, such that it is indistinguishable to a user that the motorcycle 306 is not displayed by the display system. In other embodiments, the motorcycle 306 can be displayed such that it appears to "leap out" of the landscape of the display device to present a three-dimensional experience that is not constrained by the size of the screen 152.

Figure 3D:
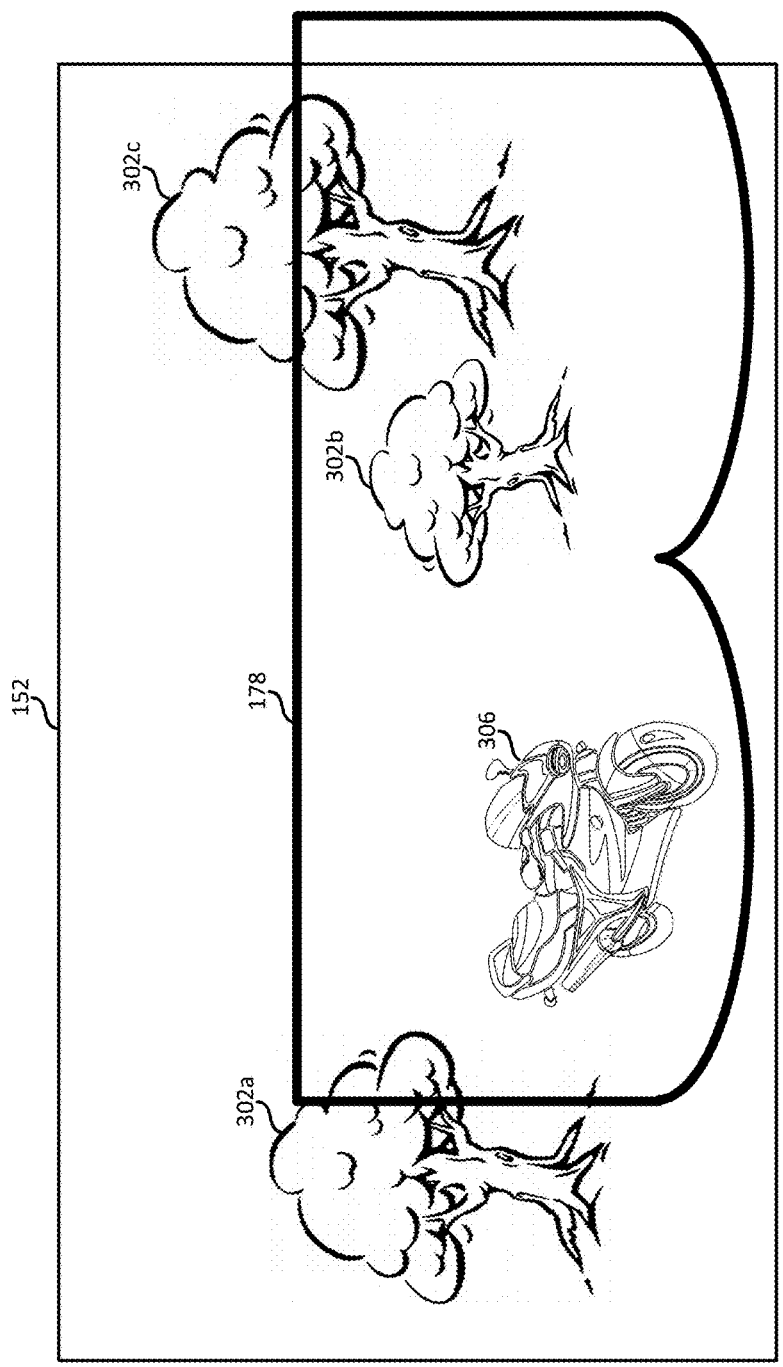
FIG. 3D illustrates the same scene after a change of position or orientation of the mobile device 178, according to some embodiments.

FIG. 3D illustrates the same scene after a change of position or orientation of the mobile device 178, according to some embodiments. The change in position of the mobile device 178 may be attributed to a user moving and/or rotating his/her head while wearing the mobile device 178. Using the position tracking sensors described above (e.g., GPS, accelerometers, gyroscopes, digital compass, etc.), the mobile device 178 can detect the change in location and/or orientation of the mobile device 178 and adjust the display presented by the mobile device 178 accordingly. Specifically, the location of the motorcycle 306 in the landscape relative to the plurality of trees 302 has not changed despite the change in location/orientation of the mobile device 178. Thus, although the image displayed by the mobile device 178 may be dependent on the location of the mobile device 178 in the environment 100, movements or rotations of the mobile device 304 need not affect the presentation of the content of the mobile device 304 relative to the content displayed by the screen 152. In other words, the content displayed on the mobile device 178 can move with the viewer's head such that it appears to stay in the same place relative to the display of the screen 152.

Figure 4A:
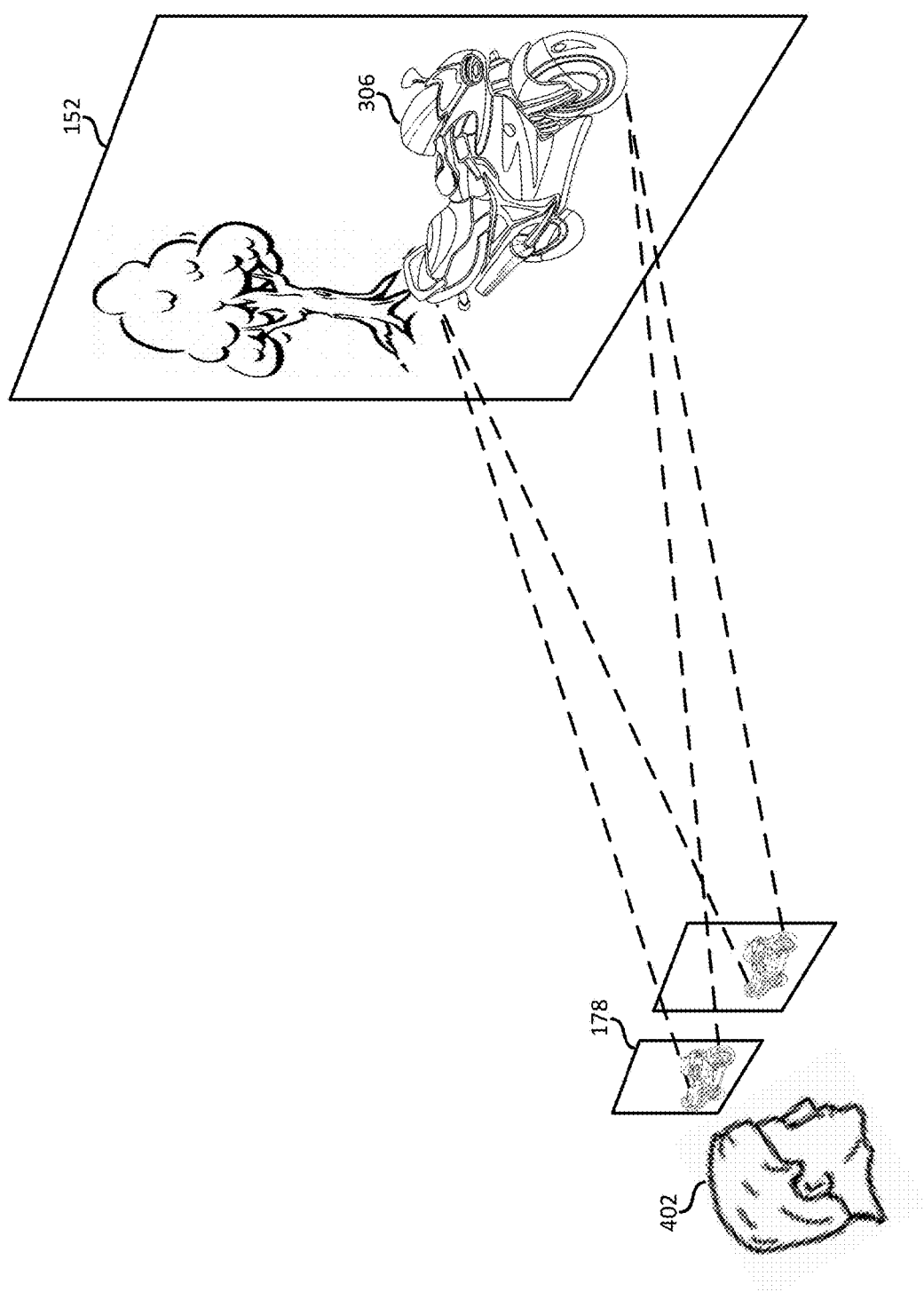
FIG. 4A illustrates the relative sizing of an image rendered for display on the mobile device as it appears layered against the screen, according to some embodiments.

FIG. 4A illustrates the relative sizing of an image rendered for display on the mobile device as it appears layered against the screen, according to some embodiments. Stereo images of the motorcycle 306 can be generated for display on the mobile device 178. FIG. 4A depicts the screens/lenses of the mobile device 178. Because the image plane corresponding to the mobile device 178 is closer to the position of the virtual camera (i.e., the eye of the viewer 402) then the image plane of the screen 152 in the virtual 3-D scene and in the environment 100, the image of the motorcycle 306 displayed on the mobile device 178 may be sized such that the motorcycle 306 appears proportionally correct when visually layered against the screen 152 according to the perception of the viewer 402.

Figure 4B:
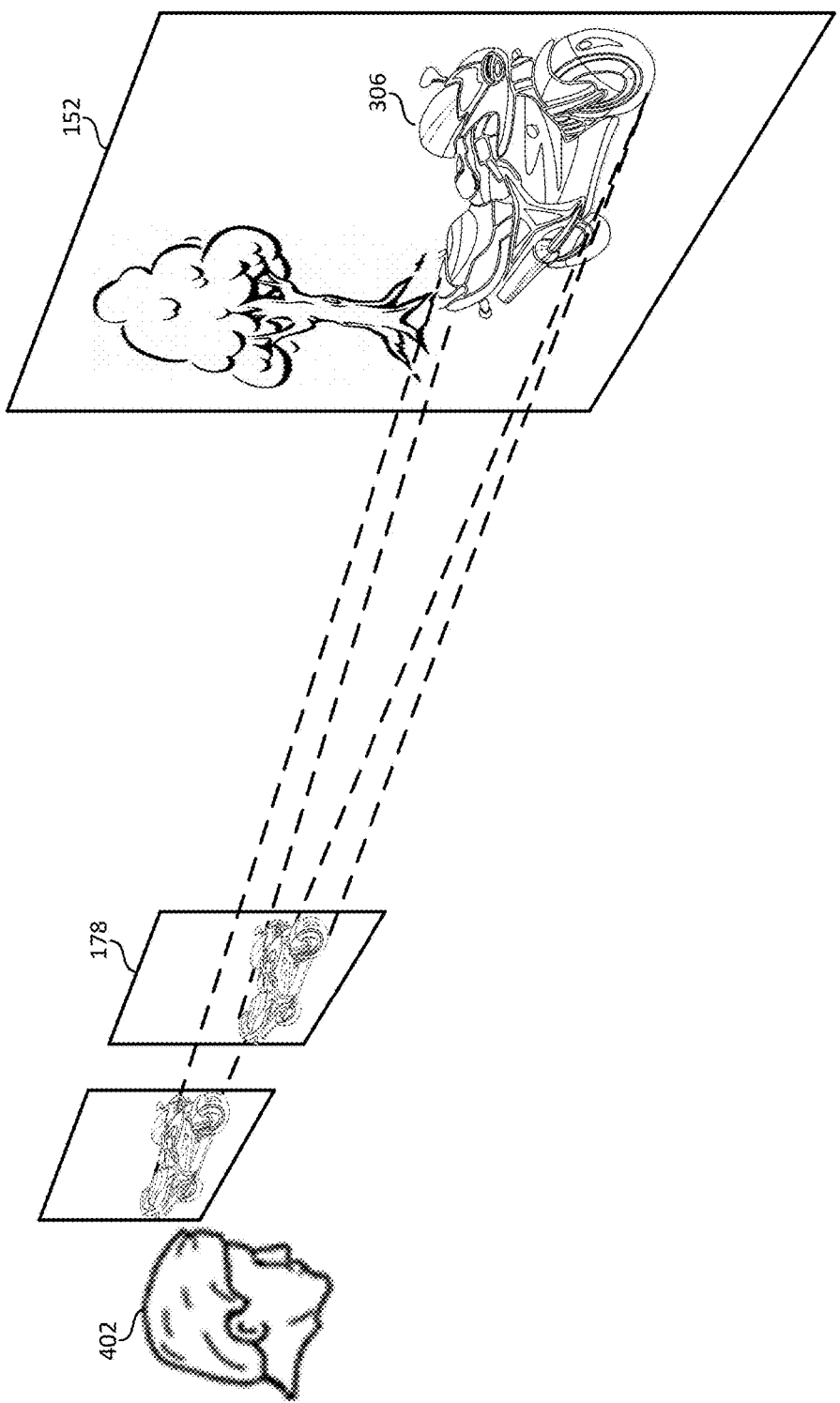
FIG. 4B illustrates the scene of FIG. 4A at a new perspective, according to some embodiments.

FIG. 4B illustrates the scene of FIG. 4A at a new perspective, according to some embodiments. As described above, some of the three-dimensional elements may need to be skewed before being rendered in order to have the image displayed on the mobile device 178 match the skew of the images displayed on the screen 152. In FIG. 4B, the user 402 is positioned to the extreme left side of the screen 152 (e.g., location 122 of FIG. 1A). Because the viewer 402 will view the screen 152 from an angle, 2-D images displayed on the screen 152 will be skewed compared to how the same images would be perceived when viewing the screen 152 from the center of the environment 100. The angle at which the viewer 402 deviates from the 90° normal of the screen 152 can be used as a factor in a skew angle to deform the 3-D object of the motorcycle 306 before his rendered for display on the mobile device 178, or to stretch/compress prerendered 2-D images for display on the mobile device 178. By doing so, skewed images of the motorcycle 306 displayed on the mobile device 178 in FIG. 4B can match the skew of the screen 152, such that the motorcycle 306 will appear to be a normal part of the scene on the screen 152.

FIG. 5A illustrates an image displayed on the mobile device that is attached to the screen and consistent across viewing locations, according to some embodiments. In this embodiment, the motorcycle 306 is "attached" to the screen 152. In other words, the motorcycle 306 is close enough to the screen 152 that the position of the motorcycle 306 in the 3-D virtual environment from which the mobile device images are rendered does not change. This embodiment gives the appearance of a 3-D projection coming out of the screen to the viewer, but does not change location based on the location of the viewer. To illustrate, a mobile device on a viewer sitting in location 124 directly in front of the screen 152 will see the motorcycle 306 as shown in FIG. 5A. Although appearing to pop out from the screen 152, the projection 502 of the motorcycle 306 will be directly behind the motorcycle 306 on the screen 152.

Figure 5B:
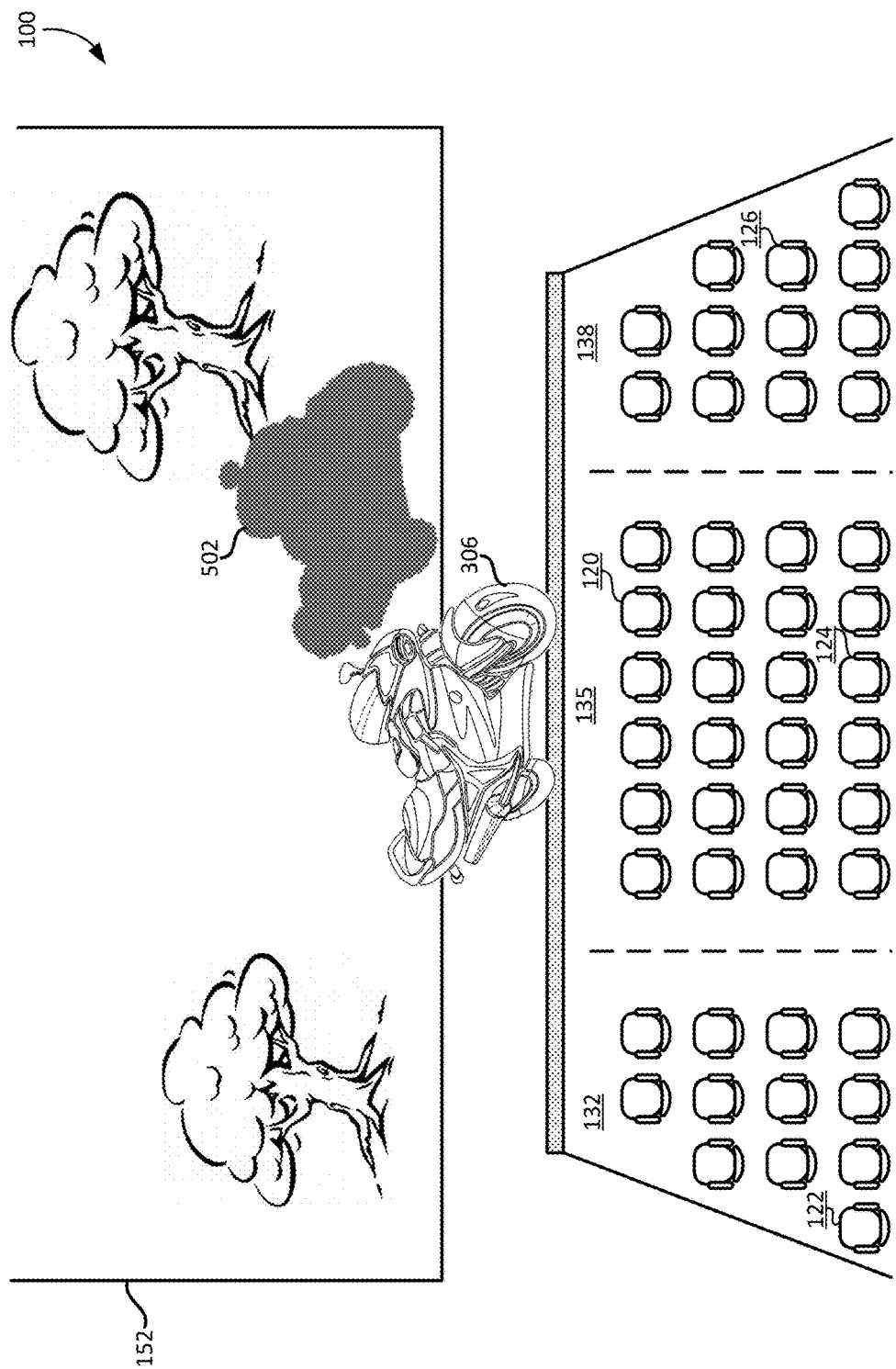
FIG. 5B illustrates an image displayed on the mobile device when viewed from a position to the left of the screen, according to some embodiments.

FIG. 5B illustrates an image displayed on the mobile device when viewed from a position to the left of the screen 152, according to some embodiments. In FIG. 5B, the motorcycle 306 is located at the same position in the 3-D virtual scene from which the mobile device content is rendered. Therefore, the motorcycle 306 will appear to a viewer location 122 to be in the same real-world position as it would to the viewer in location 124. However, the projection 502 of the motorcycle 306 onto the screen 152 would be shifted to the right. These embodiments allow viewers to all see the same image at the same location in real-world coordinates. The difference in the location of the projection 502 on the screen 152 will be minimized because the motorcycle 306 is still relatively close to the screen 152 in real-world coordinates.

Figure 6A:
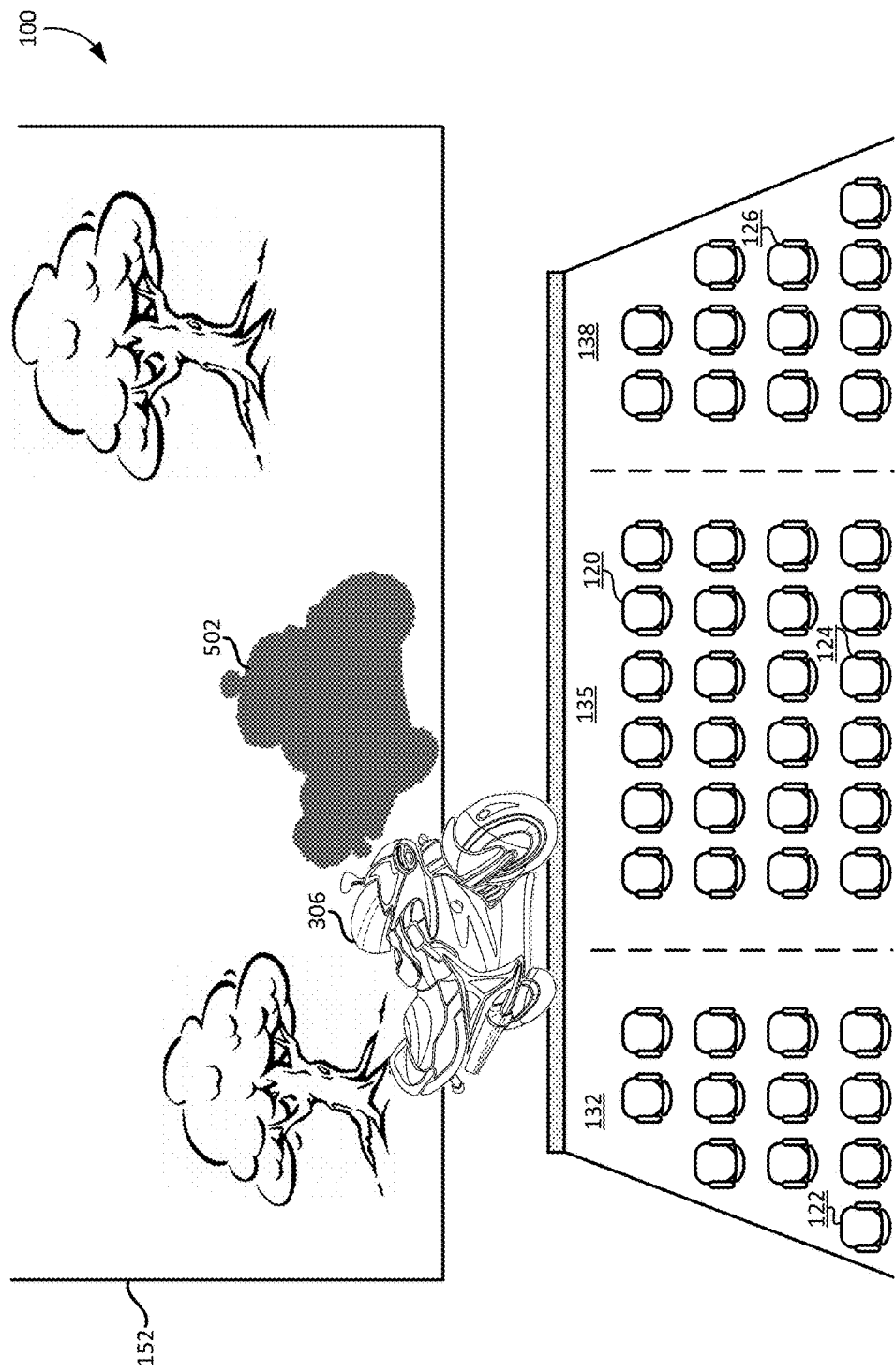
FIG. 6A illustrates an image displayed on the mobile device that is attached to a screen location with a consistent screen projection, according to some embodiments.
Figure 6B:
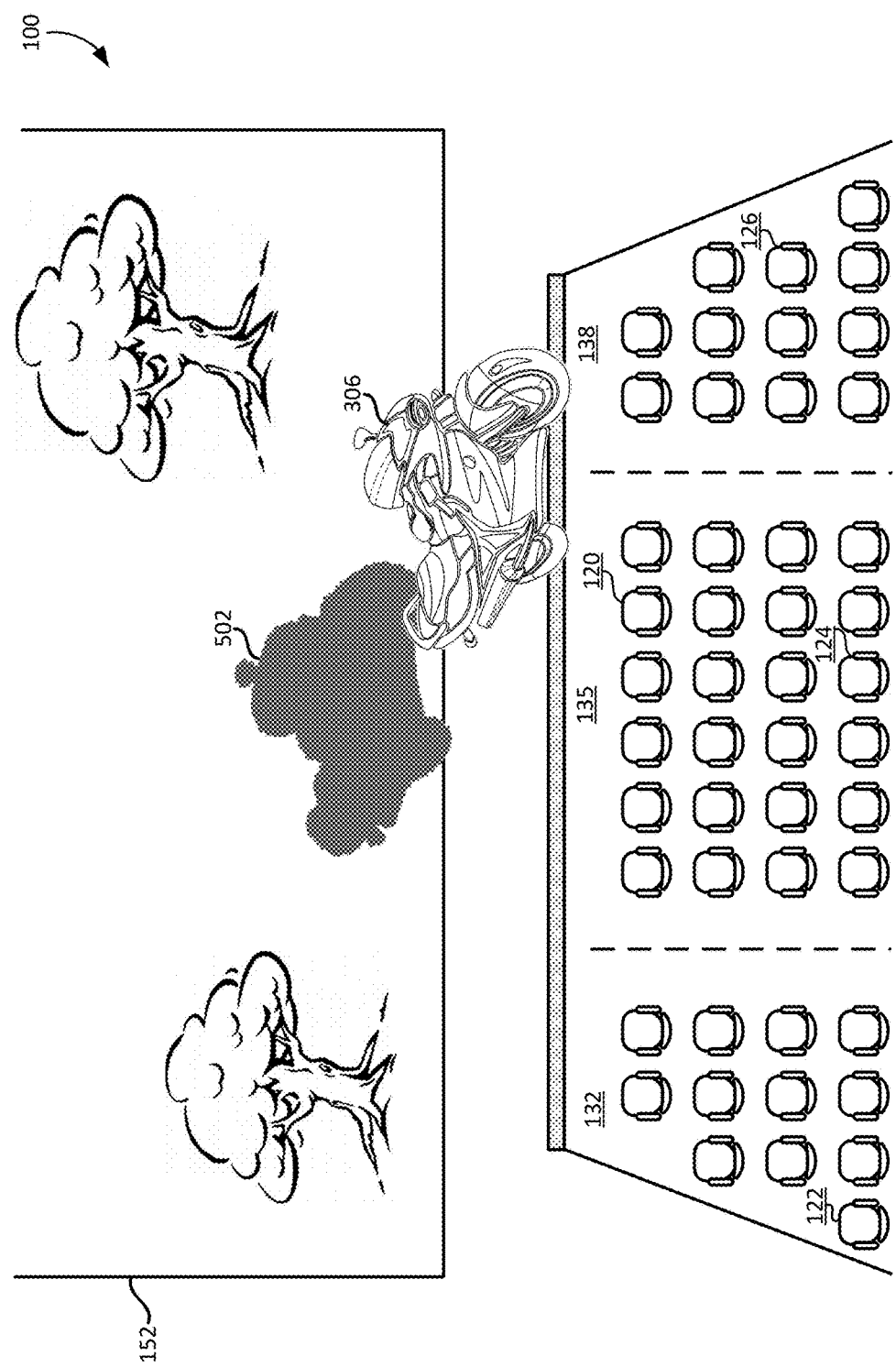
FIG. 6B illustrates the image displayed on the mobile device when viewed from a rightward viewing location, according to some embodiments.

FIG. 6A illustrates an image displayed on the mobile device that is attached to a screen location with a consistent screen projection, according to some embodiments. In this example, the viewer in location 122 would see the real-world position of the image of the motorcycle 306 shifted to the left such that the projection 502 of the motorcycle 306 remains in the center of the screen 152. In contrast, FIG. 6B illustrates the image displayed on the mobile device when viewed from a rightward viewing location, according to some embodiments. Specifically, when viewed from location 126, the image displayed on the mobile device will show the motorcycle 306 shifted in real-world coordinates to the right. However, the projection 502 of the motorcycle 306 will remain in the same location as the projection 502 in FIG. 6A. In other words, the projection 502 of the motorcycle 306 on the screen 152 remains consistent regardless of viewing location.

In order for these embodiments to be realized, the location of the mobile device can be tracked by the system and used to shift the positioning of the 3-D elements in the virtual 3-D scene. For example, the 3-D model of the motorcycle 306 in the 3-D scene would be moved to the left such that the projection through the virtual camera (i.e., the viewer location) and the projection 502 on the image pane of the movie lines up with the 3-D model of the motorcycle 306. The projection 502 on the image pane of the screen 152 will be consistent across all viewing locations. However, the position of the 3-D model of the motorcycle 306 to be rendered will change based on viewing location.

In some embodiments, each individual mobile device may have an individually rendered image displayed for the prospective viewers. In some embodiments, the environment 100 can be subdivided into spatial zones, 132, 135, 138, with each viewer in that zone receiving the same image for display on a mobile device. Although the exact positioning of viewers with an the spatial zones 132, 135, 138 may differ, the viewing experience may be substantially the same. This may reduce the bandwidth and processing needed for generating and/or transmitting real-time scene images to viewers. Although not shown explicitly, the spatial zones 132, 135, 138 can also be formed to extend radially out from a center point of the screen 152. The same images may then be used for each of the spatial zones, with the images being stretched/skewed as described elsewhere in this disclosure.

Figure 7A:
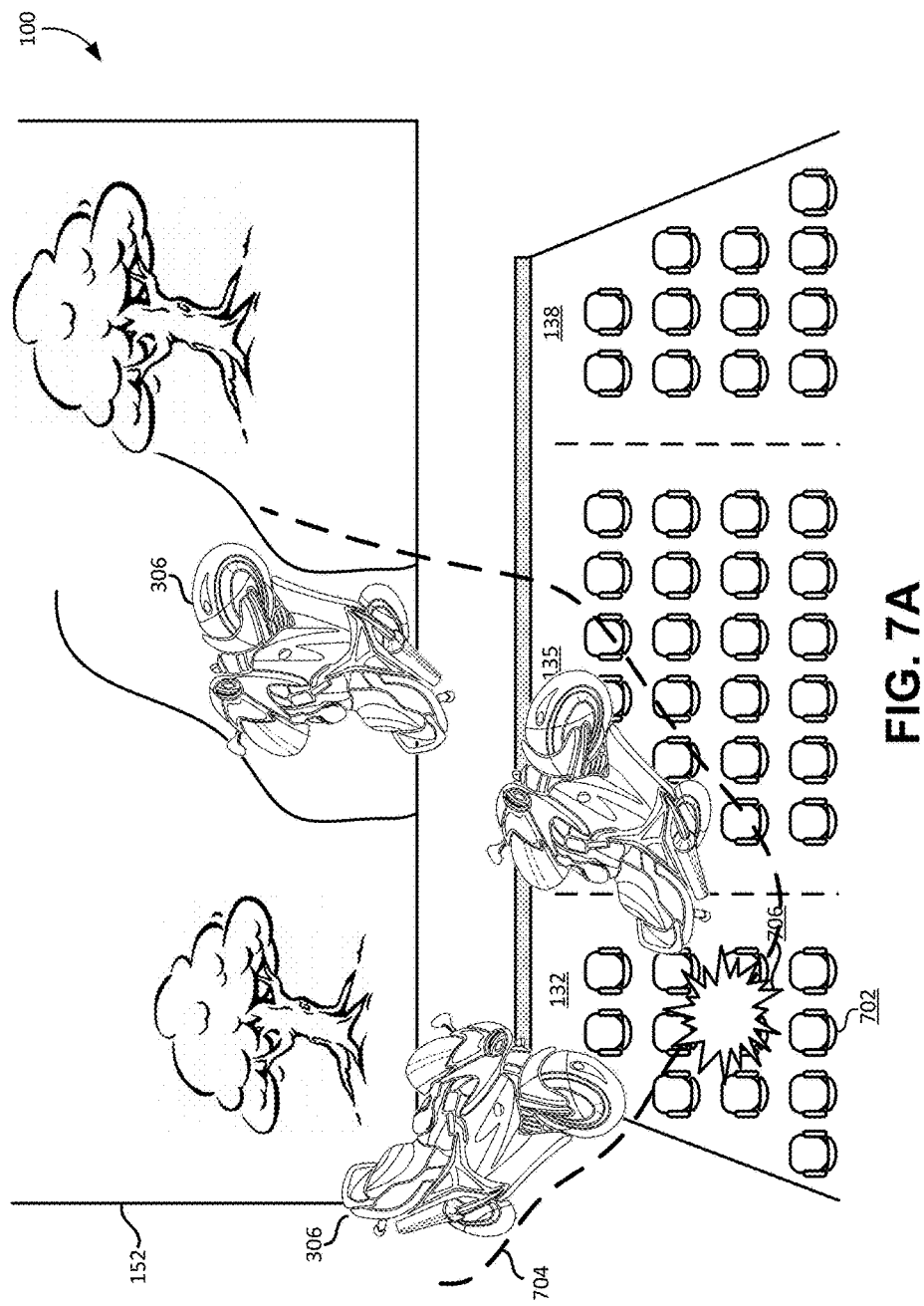
FIG. 7A illustrates an example of how a motion path traveled by an object projected on the mobile device can change according to viewing location, according to some embodiments.

FIG. 7A illustrates an example of how a motion path traveled by an object projected on the mobile device can change according to viewing location, according to some embodiments. In some motion sequences, an object may begin as being attached to the screen, then break away from the screen and move out into the audience. This can provide a 3-D effect that is not tied to the screen 152 or limited by the screen size. For example the viewer could look to the side and see a character from the movie walking down the aisle of the movie theater outside of the background of the screen 152. The motorcycle 306 could drive out over the audience and back onto the screen.

As described above, there are at least two different modes for generating images to be displayed on the mobile device. First, the object can be tied to a location on the screen such that the position of the object in the movie theater (i.e., real-world coordinates) does not change based on viewing location. Second, the object can be tied to individual viewing locations, where the position and/or motion path of the object is altered to generate a motion sequence that is the same from the perspective of the viewer, but different from the perspective of the screen 152.

In the example of FIG. 7A, the motorcycle 306 can follow a motion path 704 that pulls away from the screen, goes out into the audience, performs a stunt 706, and drives back onto the screen 152. The motion path 704 begins at the far left side of the screen 152. As the motorcycle 306 enters the scene from the left, it can be attached to the screen as described above. As the motorcycle 306 follows the motion path 704 out into the audience, the motorcycle 306 can break away from the screen. In order to generate the motion path 704, a separate rendering operation and/or compositing operation may be performed for each mobile device. The motion path 704 can be dynamically adjusted such that the stunt 706 can be performed right in front of each individual viewer. For example, a viewer in location 702 would have the motion path 704 generated such that the motorcycle 306 performed the stunt 706 directly in front of location 702. For example, the stunt may include a "fishtail" turn performed by the motorcycle 306.

In order to generate an individualized motion path in the 3-D virtual scene, a start and end point can be defined as the points where the motorcycle 306 detaches from the screen and reattaches to the screen (e.g., at the far left and far right of the motion path 704. A third point can be set for each individual mobile device such that the stunt occurs directly in front of the location of the mobile device. A general shape of the motion path can be defined for all viewing locations, and the general shape can be fitted using a curve fitting algorithm to the three points defined for each viewing location.

Figure 7B:
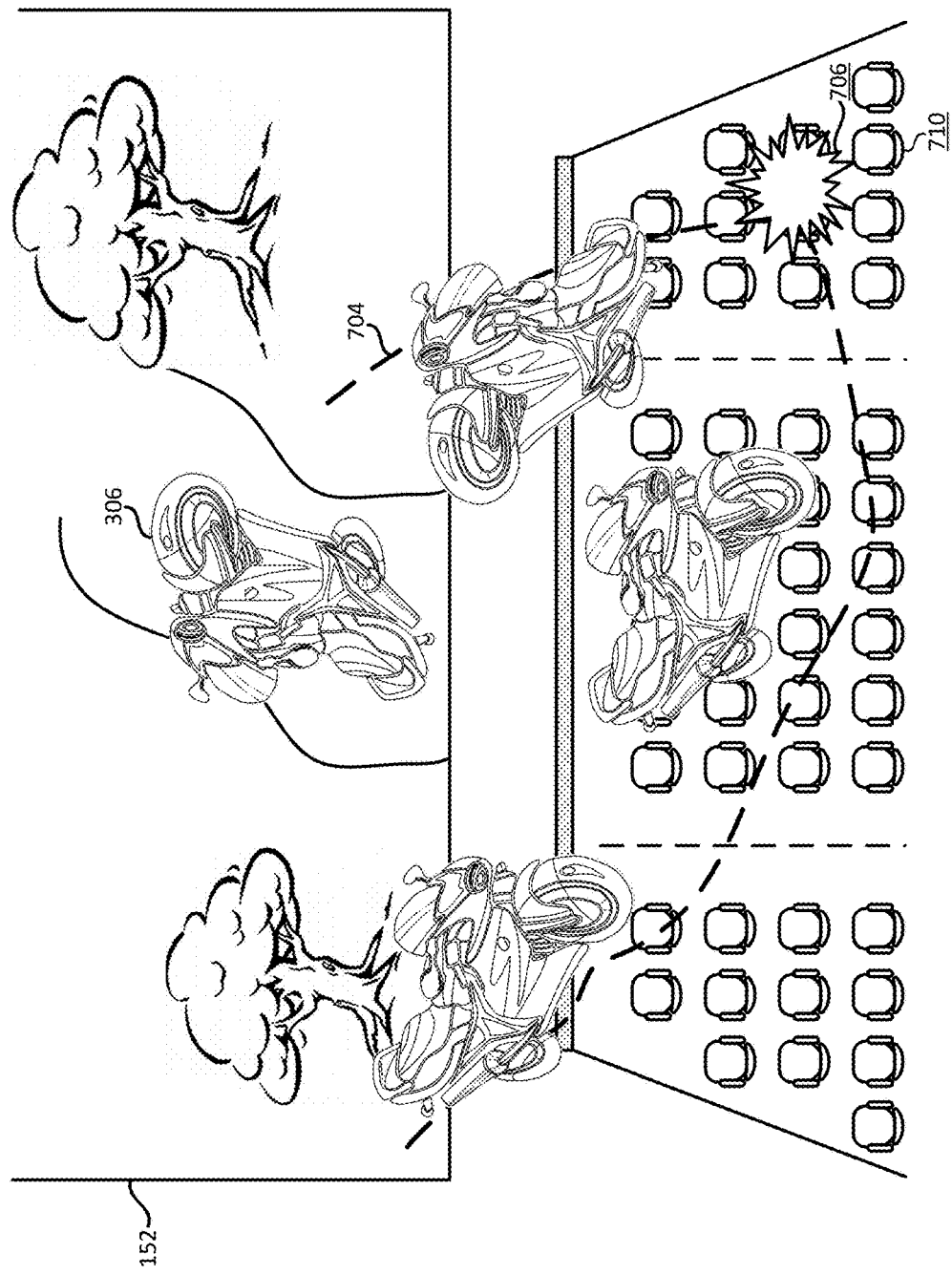
FIG. 7B illustrates a motion path that has been altered according to a different viewing location, according to some embodiments.

FIG. 7B illustrates a motion path that has been altered according to a different viewing location, according to some embodiments. Notice that the general shape of the motion path 704 in FIG. 7B is the same as the general shape of the motion path 704 in FIG. 7A. The start and end points of the motion path 704 are approximately the same, however, the position of the stunt 706 has changed to be in front of location 710. The final shape of the motion path 704 has been fitted to these three points in FIG. 7B. To generate the sequence of 2-D frames to be displayed on the mobile device, the 3-D model of the motorcycle 306 can be moved along the individualized motion paths for each mobile device in a different location. This rendering operation can be performed in real time.

Figure 8:
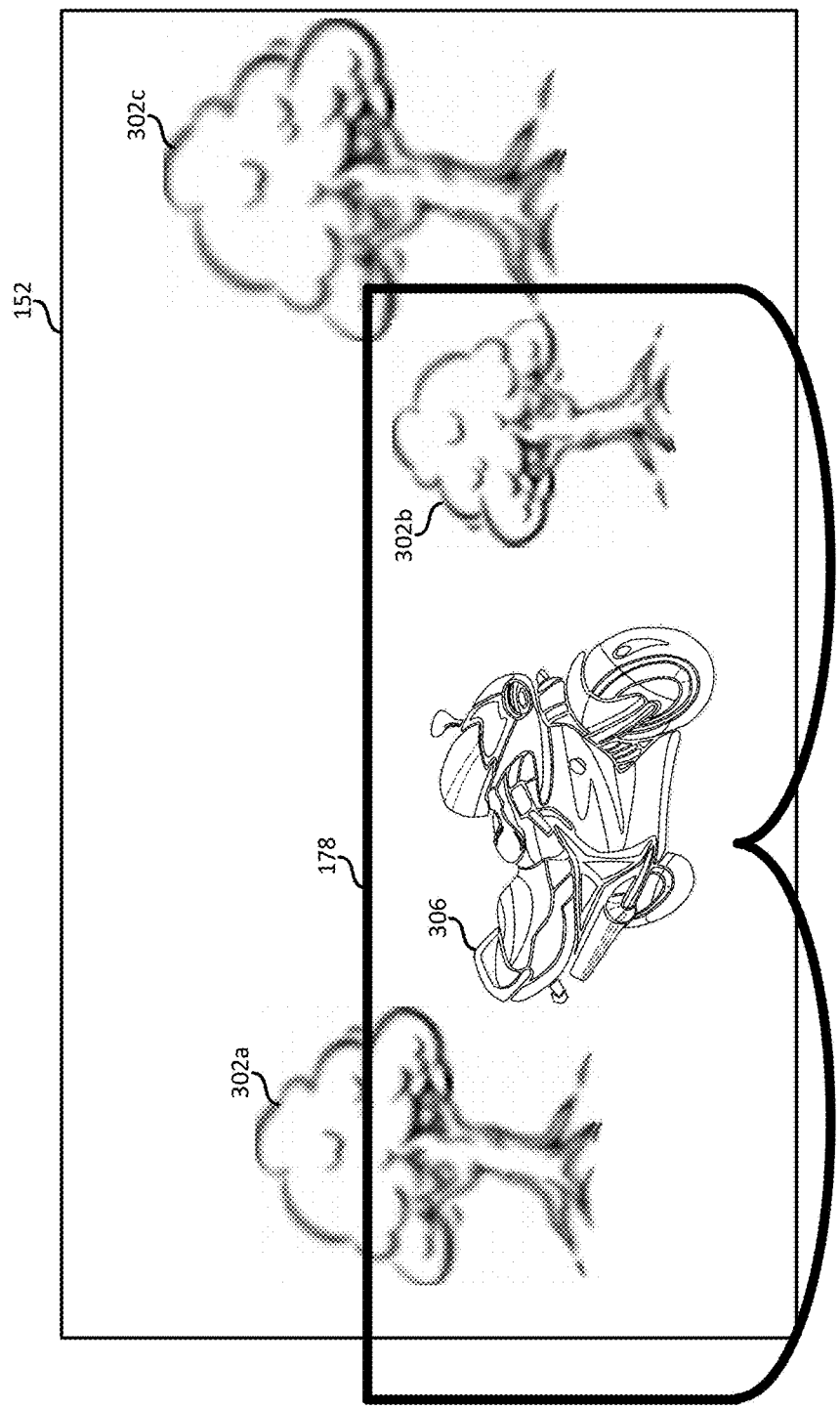
FIG. 8 illustrates a blur effect added to background landscape elements displayed on the screen, according to some embodiments.

In order to direct a viewer's attention to an object displayed on the mobile device 178 as opposed to objects displayed on the screen 152, a blur effect can be added to objects on the screen 152 in contrast to a sharpened image that can be displayed on the mobile device 178. FIG. 8 illustrates a blur effect added to background landscape elements displayed on the screen 152, according to some embodiments. As shown, the motorcycle 306 remains in focus in order to draw the viewer's attention to the motorcycle 306. In contrast, the other landscape elements displayed on screen 152 have been given a blur effect, including the trees 302. In some embodiments, the opposite effect may be executed, where objects such as the motorcycle 306 displayed on the mobile device 178 have a blur effect applied, while the landscape elements displayed on screen 152 remain in focus.

Figure 9A:
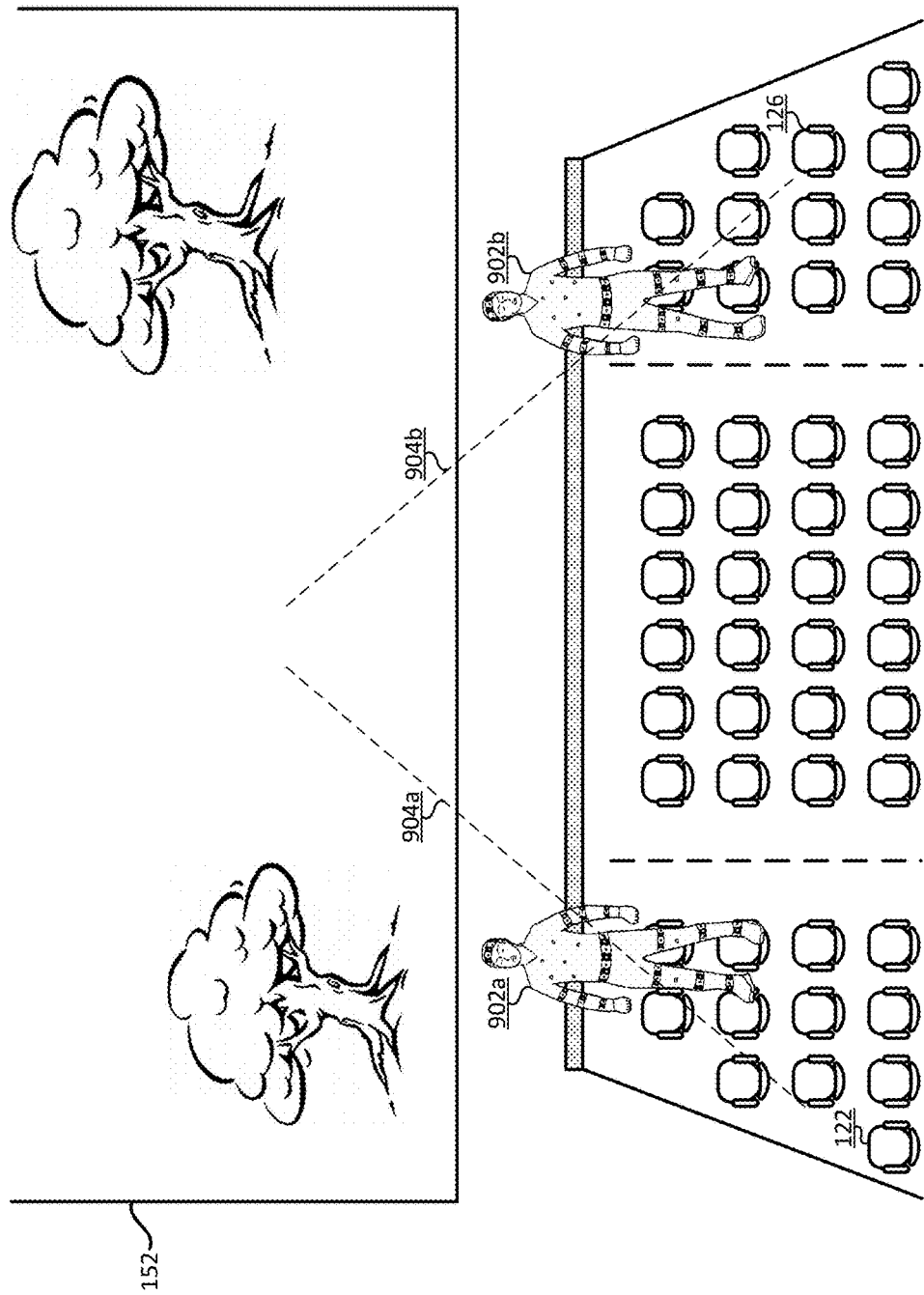
FIG. 9A illustrates individualized motion paths for interactive content at two different locations, according to some embodiments.

FIG. 9A illustrates individualized motion paths for interactive content at two different locations, according to some embodiments. In some cases, the content displayed on the mobile devices can be individualized for each viewer, as described above. Additionally, the timing and selection of content may also be individualized for each mobile device. For example, the content displayed on screen 152 can pause or loop while an interactive portion of content is played out over the mobile devices. The timing of the appearance of certain content objects can be individualized, as well as the responses generated by the content. For example, FIG. 9A illustrates a character 902 that detaches from the screen 152 and walks out into the audience. An individualized motion path 904 can be generated for each individual mobile device such that the character 902 walks to a location directly in front of each viewer. The character 902 can then express dialogue and request a response from the viewer (e.g., ask a question). The user can then provide an input via the mobile device selecting one or more options presented by the character 902. Based on the input, the behavior of the character 910 can change. Specifically, each input can be associated with a particular animated sequence and/or set of 3-D character models in the corresponding virtual scene. Based on the input, these characters and/or motion paths can be loaded into the scene and rendered in real time for viewing on a mobile device. This provides the user with a "choose your own adventure" style of enjoying a media experience.

Figure 9B:
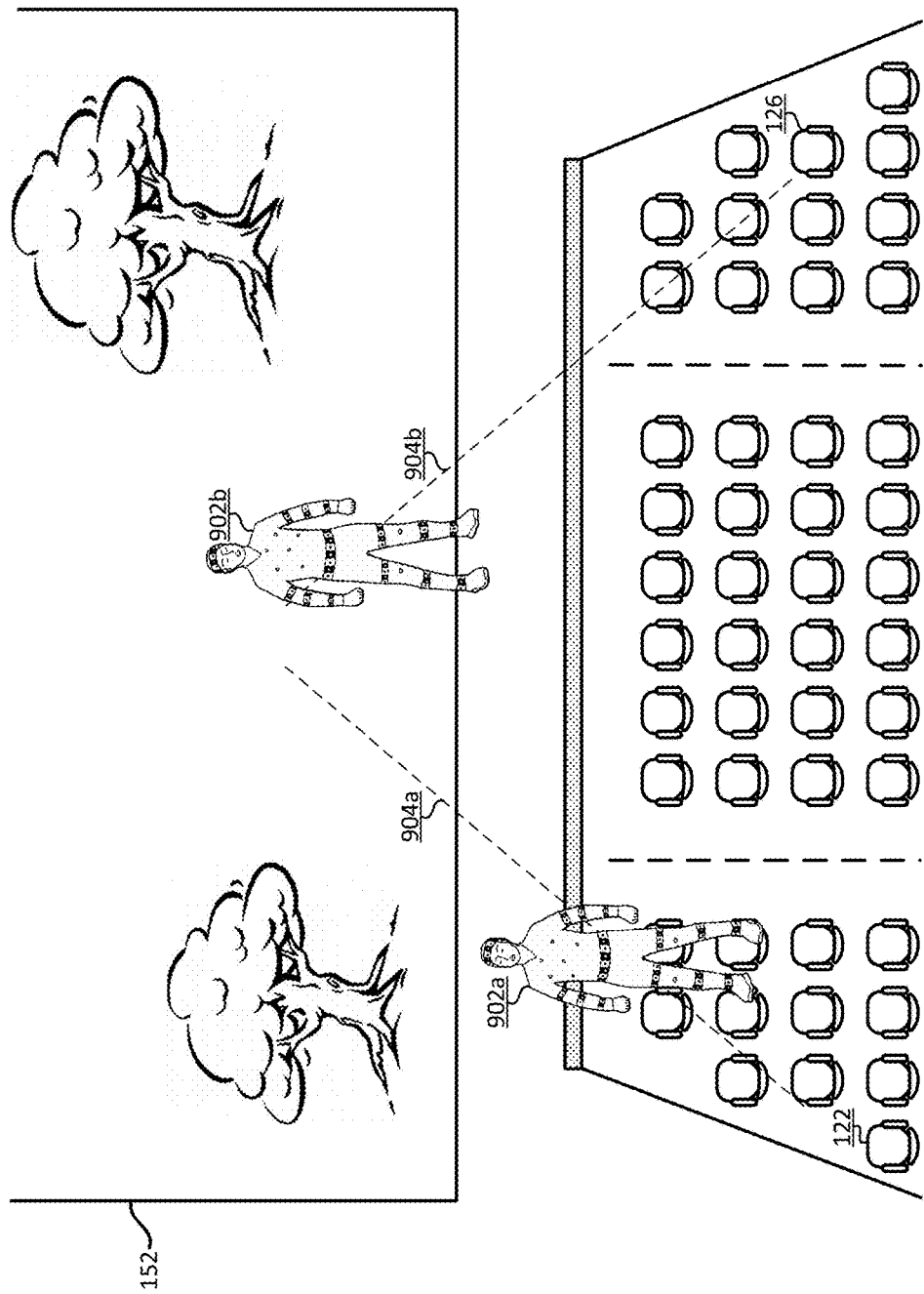
FIG. 9B illustrates how the timing of various character interactions with the audience can be individualized, according to some embodiments.

FIG. 9B illustrates how the timing of various character interactions with the audience can be individualized, according to some embodiments. The motion of character 902a and character 902b may be triggered by an input received from mobile devices of viewers at location 122 and location 126, respectively. The input may have been received from the viewer at location 122 a few seconds before input was received from the viewer at location 126. Consequently, character 902a may walk out of the screen on motion path 904a towards location 122 before character 902b walks out of the screen on motion path 904b towards location 126. Timers may also be included in the mobile content processor described above to automatically trigger the motion of character 902b in cases where an input is not received within a threshold time limit.

Figure 10B:
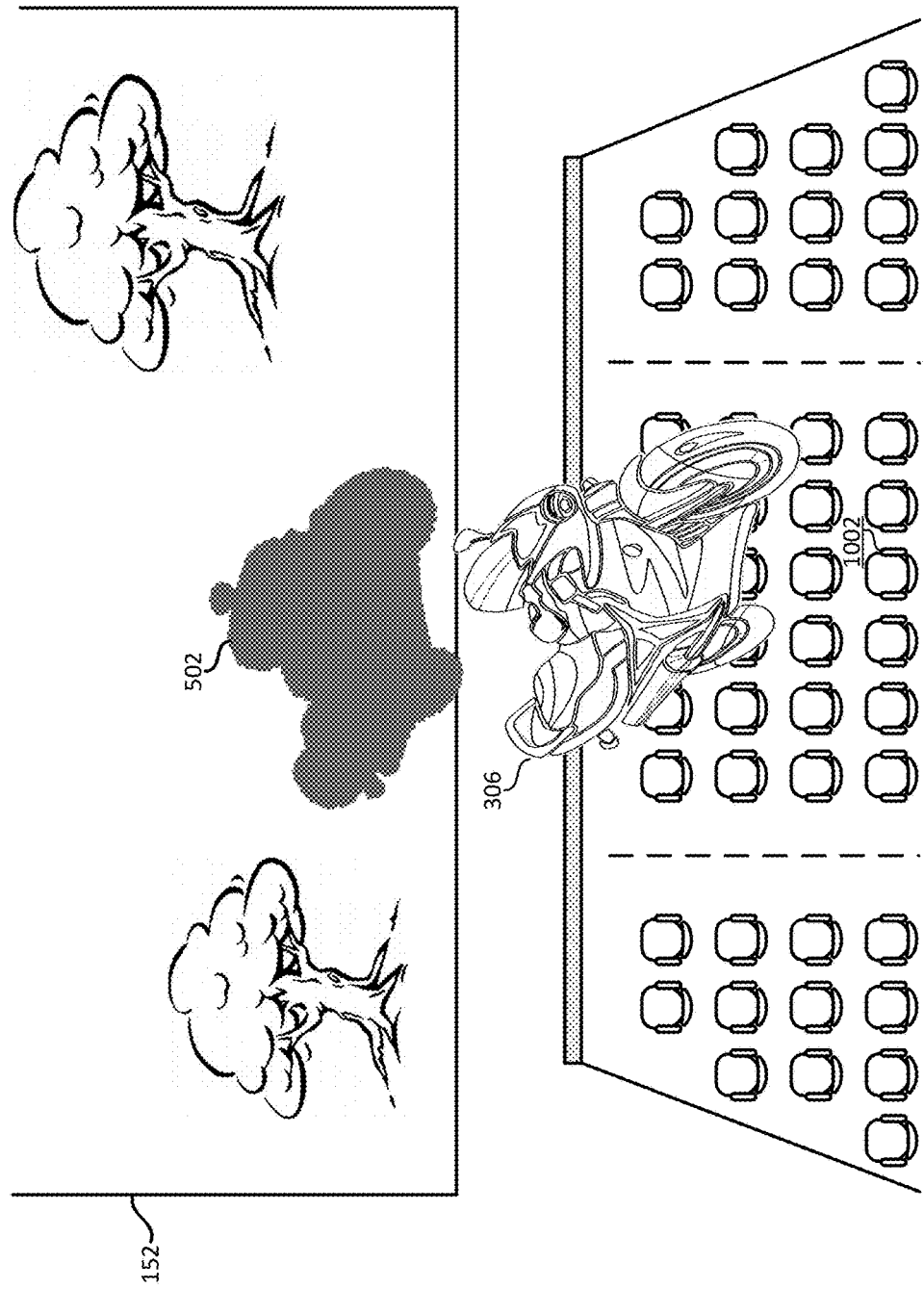
FIG. 10B illustrates an effect for viewers that are far from the screen, according to some embodiments.

FIG. 10A illustrates how content displayed on the mobile device can be compressed in depth based on a distance to the screen 152, according to some embodiments. If the viewer is sitting very close to the screen 152, such as an location 120, the image on the screen may be heavily "keystoned," or distorted in a trapezoidal fashion from bottom to top. In other words, when looking up towards the screen, the image will be larger at the top and on the bottom because the user is so close to the screen. To compensate for this effect, when the motorcycle 306 is attached to the screen 152 and meant to blend in with the landscape elements of the scene, the motorcycle 306 should also have a keystone effect applied. As illustrated by FIG. 10A, the 3-D model of the motorcycle 306 can be compressed to mimic this effect on the screen. Similarly, FIG. 10B illustrates a similar effect for viewers that are farther from the screen. As users viewers move away from the screen, the Z-depth (distance from the viewer) of objects displayed on the mobile device need not be compressed as they would need to be if they were closer to the screen. Because the relative distance from the screen changes, the Z depth of the image on the mobile device can also change such that the distances are proportional for any distance from the screen 152. For example, a viewer in location 1002 would see an uncompressed version of the motorcycle 306 that has been elongated, with the projection 502 of the motorcycle in the same location as shown in FIG. 10A.

FIG. 11A illustrates how a dynamic compositing operation can be used to have objects displayed by the mobile device interact with objects displayed on the screen, according to some embodiments. In this example, a character 1102 can have a defined motion path 1106 that leads behind a first tree 1104 and in front of a second tree 1108. The character 1102 and the first tree 1104 may be displayed by the mobile device, and thus appear to "pop out" of the screen 152 and enter the area of the audience in the theater. The second tree 1108 can be displayed by the screen 152. The view illustrated by FIG. 11A will be shown from the perspective of a viewer sitting in location 120.

In order to provide dynamic motion paths that will be viewed differently based on location in the viewing environment, the real-time compositing operation and/or rendering operation described in FIG. 1B can render, composite, and/or display the character 1102 in relation to the first tree 1104 based on viewing location. In some embodiments, a 3-D virtual scene that includes a digital model of the character 1102 and a digital model of the first tree 1104 can be rendered from a position in 3-D-scene coordinates corresponding to the location 120 of the viewer.

Figure 11B:
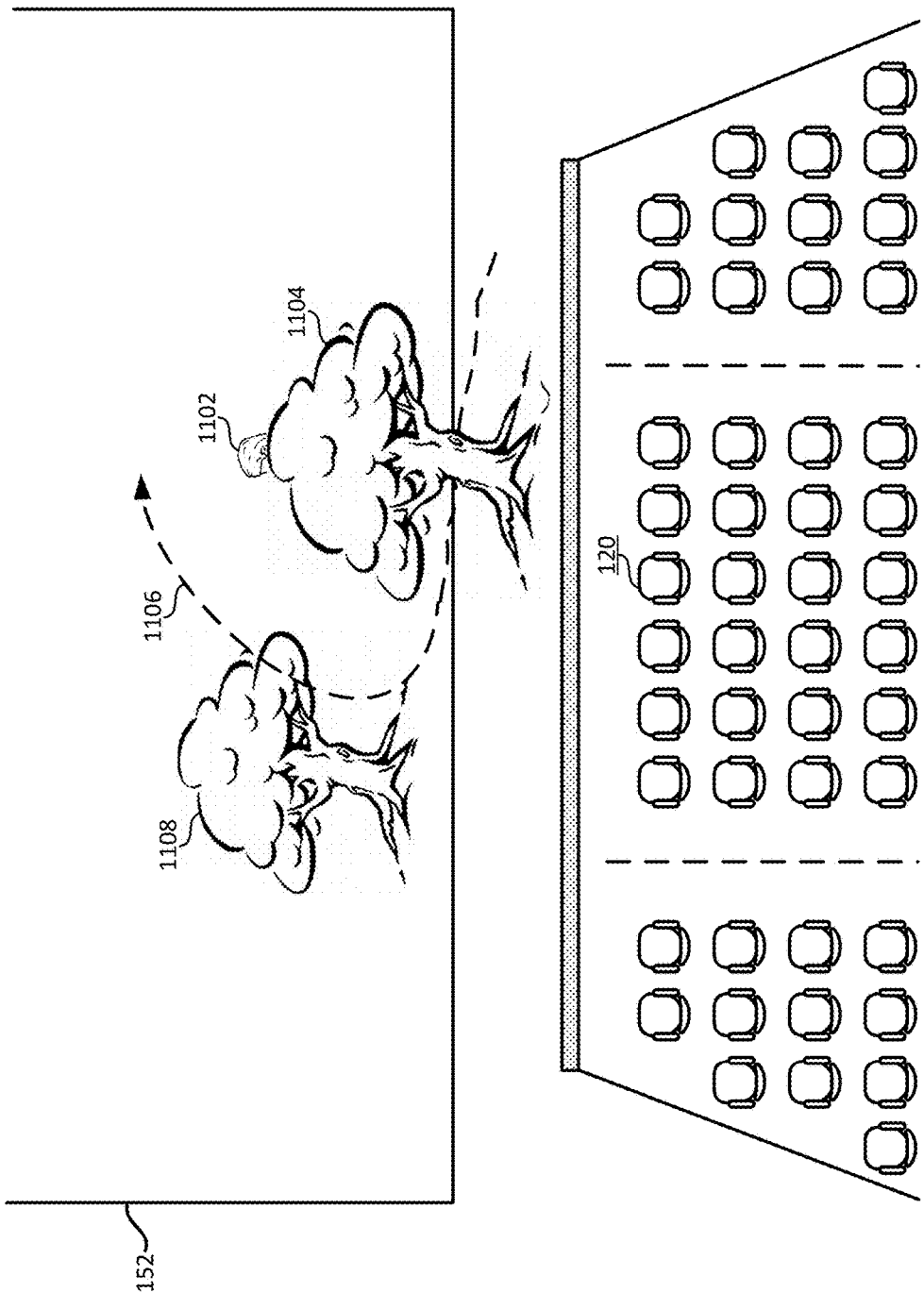
FIG. 11B illustrates how the character passes behind the first tree while moving along the motion path, according to some embodiments.

FIG. 11B illustrates how the character 1102 passes behind the first tree 1104 while moving along the motion path 1106, according to some embodiments. At this stage, the character 1102 would be behind the first tree 1104 from the perspective of a viewer in location 120. Rendering this scene in real-time from the perspective of the viewer in location 120 would obscure most of the character 1102 from view behind the first tree 1104.

In contrast, FIG. 11C illustrates how the character is viewed differently at the same point in time from a different location in the viewing environment, according to some embodiments. From the perspective of a viewer in location 1112, the character 1102 has already passed out from behind the first three 1104. This difference may occur for multiple reasons. In some cases, the perspective of the viewer in location 1112 may be such that the character 1102 is not obscured by the first tree 1104. In some cases, different timing triggers may have been activated as described in relation to FIGS. 9A-9B such that the character 1102 has already come out from behind the first tree 1104 while following the motion path 1106 according to viewer at location 1112, but the character 1102 has not yet come out from behind the first tree 1104 according to viewer at location 120.

The character 1102 is shown to be passing in front of the second tree 1108 according to the motion path 1106. In some embodiments, the character 1102 could instead pass behind the second tree 1108, even though the second tree 1108 is displayed by the screen 152 while the character 1102 is displayed by the mobile device. To show the character 1102 in front of the second tree 1108, the entire character 1102 can be rendered for display on the mobile device. Because the mobile device display will overlay the display on the screen 152, the character 1102 will appear to be in front of the second tree 1108. When the character 1102 is behind the second tree 1108, the 3-D scene rendered for display on the mobile device can include a model of the second tree 1108. During the rendering and compositing of the image, portions of the character 1102 will be occluded by the second tree 1108. However, the second tree 1108 can be removed from the rendered images displayed on the mobile device. Thus, as the character 1102 appears to walk back into the screen 152, portions of the character 1102 can be cut out of the display of the mobile device such that the character 1102 appears to be walking behind the second tree 1108.

Figure 12:
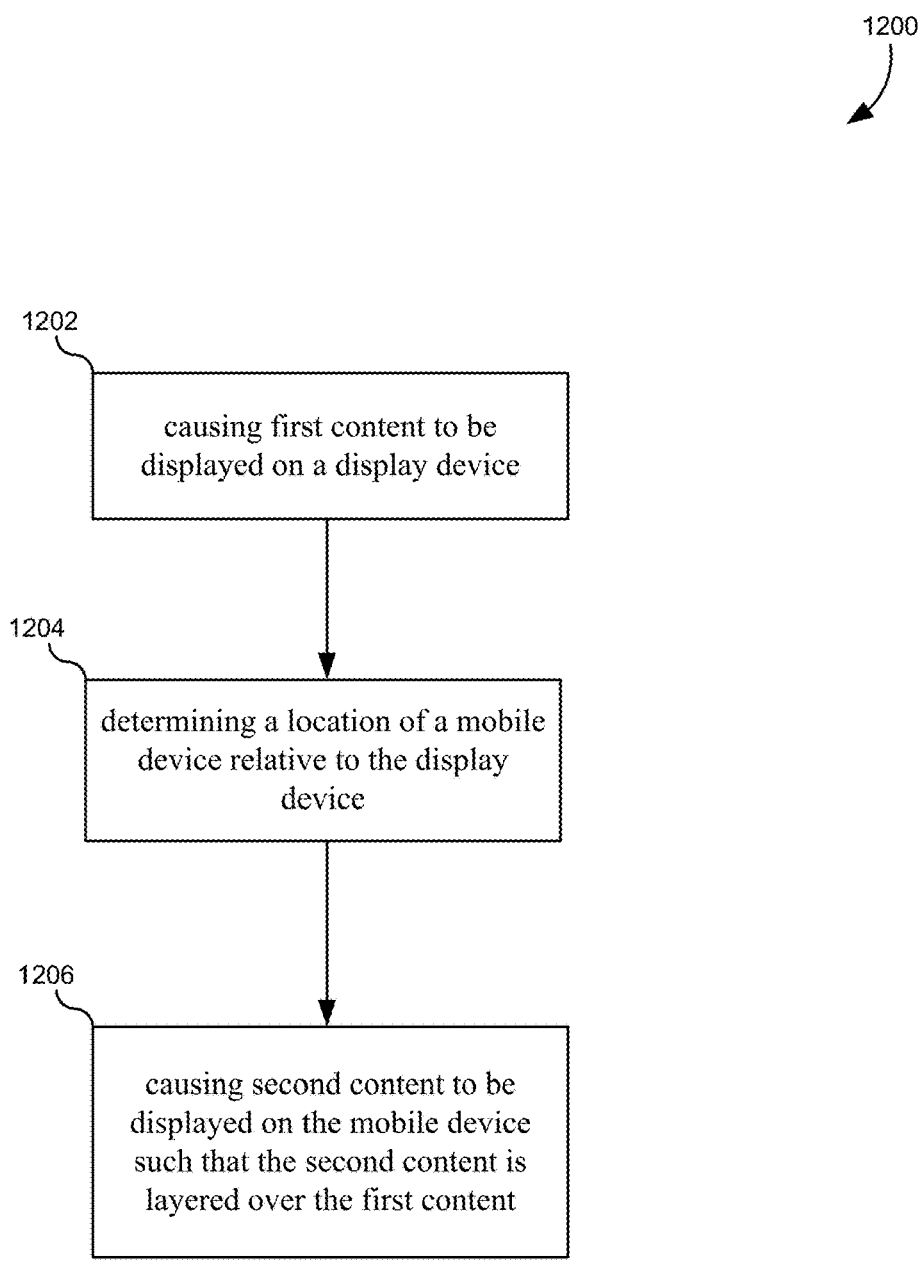
FIG. 12 illustrates a flowchart of a computer-implemented method for displaying layered content across multiple devices, according to some embodiments.

FIG. 12 illustrates a flowchart of a computer-implemented method for displaying layered content across multiple devices, according to some embodiments. The method may include causing first content to be displayed on a first display device (1202). The first display device may comprise a theater screen in a movie theater. The method may further include determining a location of a mobile device relative to the display device (1204). Additionally, an orientation of the mobile device may be determined relative to the display device. The mobile device may comprise a pair of AR glasses worn by a viewer. The mobile device may be positioned such that the first content is visible to a viewer of the mobile device. The method may further include causing second content to be displayed on the mobile device such that the second content is layered over the first content as viewed by a viewer of the mobile device (1206). In some embodiments, the second content may be generated and/or altered based on a determined dimension of the display device.

In some embodiments, the mobile device may be associated with one or more input buttons that allows the user to turn off or remove the additional content from the first mobile device's display. In this way, a user can choose whether to continue viewing the additional content layered over the item of content or to simply view just the item of content alone. In some embodiments, the additional content may be customized for the individual user. For example, if the user's favorite color was previously input as being blue, then the flying saucers may be presented in a blue color. If the user has a preference for a particular model of a starship, the first mobile device may present the preferred starship rather than the flying saucer. In some embodiments, the user may have previously input the preferences directly into the first mobile device. In other embodiments, the first mobile device may download the preference information from a customer account of the user after receiving explicit authorization from the user to access the customer account.

In one embodiment, the mobile device may use a built-in camera or some other sensor (depth sensor, GPS, accelerometer, wifi, etc.) to determine (e.g., automatically measure) the size of, distance from, format, and/or other attributes of the display system. Based on this determination, the mobile device may automatically scale the additional content that it displays. In this way, the size of the additional content can be made consistent with the size of the content being presented via the display system. For example, if a user is sitting relatively far from the screen 152 of the display system, the mobile device may automatically determine that objects it presents should be made accordingly smaller. As another example, if the mobile device is used with a display system having a screen of 20 feet across and a user of the mobile device is sitting 5 feet away from the screen, then the mobile device may present additional content with a scale based on the aforementioned screen size and user distance from the screen 152. If the mobile device is thereafter used with another display system having a screen of 10 feet across and the user is sitting 10 feet away from the screen, then the first mobile device may present additional content at a different scale based on the aforementioned subsequent screen size and user distance from the screen.

In another embodiment, the first mobile device may automatically determine the position of the user relative to the display system based on a built-in camera or some other sensor (depth sensor, GPS, accelerometer, Wi-Fi, etc.). Based on the position of the user, the first mobile device may place the additional content at different locations on its display. For example, if a user is sitting at the extreme right side of a movie theater (the display system), the first mobile device may place its additional content based on the user's location.

Content Generation System

Some embodiments of the present invention are directed at a system, method, and techniques for generating content (e.g., a feature film). In one embodiment, a representative system includes a rendering system, a first mobile device, a second mobile device, a content creation system, a motion capture system, and a third mobile device. It should be appreciated that there may be additional components to the representative system. Additionally, certain components (e.g., the motion capture system) may not necessarily be required by the system. Components may also be combined. In one embodiment, each of the components in the system may be connected over a suitable connection. In one embodiment, the components may be connected over the Internet or a local Intranet.

The rendering system may include one or more computers capable of rendering a 3D virtual environment in real-time and/or at interactive frame rates. The first mobile device may be any suitable mobile device, such as a tablet, smartphone, virtual reality/augmented reality glasses/goggles, watch, laptop, etc. The second mobile device, likewise, can be any suitable device, such as a tablet, smartphone, virtual reality/ augmented reality glasses/goggles, watch, laptop, etc. The third mobile device may also be any suitable mobile device, such as a tablet, smartphone, virtual reality/augmented reality glasses/goggles, watch, laptop, etc. The content creation system may include one or more computers capable of editing and/or generating highly detailed, high fidelity and/ or film production grade content. The motion capture system may be a system that includes one or more sensors usable for tracking the performance of a person (e.g., an actor) in a performance space. The sensors may track the performance of a person using one or more physical markers, wireless transmitters, actor-related depth information, actor-related GPS information, etc.

In one embodiment, the content creation system may be used to create and/or generate a 3D virtual environment. The 3D virtual environment may be a virtual set in which one or more scenes of an item of content (e.g., a movie) will take place. For example, the 3D virtual environment may be a virtual desert. As another example, the 3D virtual environment may be a digital replica of the city of San Francisco. The 3D virtual environment may also include one or more objects such as buildings, rock formations, clouds, the sun, the moon, bridges, water, foliage, vehicles, animals, tools, characters, and/or the like.

In one embodiment, the 3D virtual environment is loaded into the rendering system such that the rendering system renders image frames of the 3D virtual environment from the perspective of a virtual camera and transmits the image frames to the first mobile device. The first mobile device may, in turn, present the image frames generated and transmitted from the rendering system over a built in display of the first mobile device. The image frames may be presented to a user at or above a particular frame rate (e.g., 15 frames per second, 30 frames per second, 60 frames per second, 120 frames per second, etc.).

In one aspect, the first mobile device may be a tablet or similar device. A user of the first mobile device may interact with the first mobile device to move a virtual camera around the 3D virtual environment. In one aspect, the virtual camera may be controlled by using one or more gestures input directly to a touchscreen of the first mobile device. For example, the user may input a swipe gesture with a single finger to pan or tilt the virtual camera according to the direction of the swipe. The user may furthermore input a swipe gesture with two fingers to move the camera according to the direction of the swipe. The user may moreover input a pinch gesture to "dolly" the virtual camera. In another aspect, the virtual camera may be controlled by physically changing the position of the first mobile device and/or changing the orientation of the first mobile device. For example, a user may move forward 2 feet from his or her current location while holding the first mobile device. The first mobile device may detect such movement based one or more sensors of the first mobile device (e.g., an accelerometer, gyroscope, GPS, depth sensor, camera, wireless radio, etc.). The information regarding the detected movement may be transmitted to the rendering system which may in response shift the virtual camera and transmit image frames to the first mobile device with the virtual camera having moved forward 2 virtual feet in the virtual environment.

In one aspect, a user interface displayed on the first mobile device may include indicators (e.g. text, icons or buttons) regarding various settings for the virtual camera. For example, the user interface may display the current height, location, and orientation of the virtual camera. The user interface may also display information regarding the focus, crop-factor/aspect ratio, f-stop, and/or lens type of the virtual camera. In some embodiments, the user may interact with the indicators and/or the first mobile device in order to change various settings associated with the virtual camera. For example, the indicators may enable the user to change the focus, crop-factor, f-stop, and/or lens type of the virtual camera. Illustratively, a user may select an icon to change the lens of the virtual camera from 50 mm to 120 mm. As such, the image frames displayed to the user may exhibit the features of a 120 mm lens, including any lens distortion effects, zoom, etc. As another example, the user may select a focus indicator. Upon selecting the focus indicator, the user may select various objects or parts of the 3D virtual environment by contacting his or her finger to the location of the object or part as displayed on the screen of the first mobile device. The position information for the user's finger may be transmitted by the first mobile device to the rendering system. The rendering system, in turn, may generate or "shoot" one or more virtual, invisible rays from the current position of the virtual camera into the 3D virtual environment based on the position information. Upon detecting an intersection of the one or more rays with a virtual object or part of the 3D virtual environment, the rendering system determines that the intersecting object and/or part should be placed in focus. Accordingly, the 3D virtual environment is rendered with the object/part placed in focus. Furthermore, depending on the virtual distance of other objects in the 3D virtual environment relative to the in-focus object (and the selected lens type/f-stop), the rendering system applies varying degrees of focus to the other objects. For example, an object far away from the selected in-focus object in the 3D virtual environment may be rendered with a slight blur. In some instances, the amount of blur applied to an object may increase as the object is further away from the in-focus object in the 3D virtual environment.

The user may interact with the displayed indicators in any suitable manner in order to perform a change to the settings of the virtual camera. In some embodiments, the user may first select the indicator associated with the setting to be changed by tapping on the indicator. Thereafter, the user may perform one or more gestures to change the settings associated with the selected indicator. For example, after selecting the f-stop indicator, the user may increase the f-stop by performing a swipe gesture to the right. The user may decrease the f-stop by performing a swipe gesture to left. Additionally, after selecting the lens type indicator, the user may select lens with progressively higher zoom by performing swipe gestures to the right. The user may select lens with progressively less zoom (or wider angle) by performing swipe gestures to the left.

In some embodiments, rather than specifically selecting an indicator, the user may use different gestures to determine which lens setting/parameter to change. For example, swiping horizontally with a three fingers on the touchscreen of the first mobile device may change the f-stop. Swiping horizontally on the screen with four fingers may cause a change in the lens type. Double tapping on the location of an object on the touchscreen of the first mobile device may focus the virtual camera on the object.

In another aspect, the user interface of the first mobile device may enable the user to select a particular "crop factor" or "aspect ratio" to be applied to the image frames shown to the user to simulate different movie or cinematic formats. In one embodiment, the cropped out area may be completely opaque. In other embodiments, the cropped out area may be semi-translucent such that the portions of the 3D virtual environment in the cropped out area can be partially seen. In certain embodiments, the degree of transparency of the cropped out area may be changed by the user. For example, the user may indicate a 25%, 50%, or 75% degree of transparency. In this way, a director can understand what parts of the 3D virtual environment may be left out in a finally completed item of content.

In one aspect, as the user is moving the virtual camera around the 3D virtual environment, he or she may indicate to the first mobile device to save a "bookmark" of the virtual camera's current location, orientation, and any associated parameters. In effect, the bookmark saves a shot taken from the virtual camera using specific camera parameters. In some embodiments, the user interface provided by the first mobile device may additionally enable the user to annotate or include notes for the bookmark. For example, the user can provide an overall annotation or annotations for the bookmark. As another example, the user can select different areas of the bookmarked shot and place separate annotations at those areas. In some embodiments, the user may also attach a rating to the bookmark. The bookmarks may be sorted according to the rating when later accessed as described below.

In one aspect, the generated bookmarks and any annotations may later be used to re-load the 3D virtual environment from the perspective of the virtual camera with the associated parameters by the rendering system and/or content creation system. When re-loaded by the rendering system, the virtual camera is placed at the position and orientation indicated by the bookmark with any associated camera parameters. Thereafter, the user can begin moving and/or interacting with the virtual camera from the position in the 3D virtual environment. Discussion of re-loading the bookmark into the content creation system is discussed below. In some embodiments, any previously generated bookmarks may be presented in a list sorted by rating and/or by most recent modification. In certain embodiments, the bookmarks presented to a user may have been created by several different other users across several different 3D virtual environments. The user may organize such bookmarks into a playlist in which each shot is present to the user in the order of the playlist.

In some embodiments, the representative system may include a selection device. The selection device may be, for example, a smartphone, tablet, or any other device configured to include sensors or sensing mechanisms (e.g., infrared reflective targets). For example, the selection device may be a device that includes one or more buttons and a set of infrared reflective targets. The buttons may allow the selection device to send command signals to the rendering system in order to perform various functions. The infrared reflective targets may allow sensors of the motion capture system to track the position of the selection device at any given time. In some embodiments, the selection device may be a different device from the first mobile device. In other embodiments, the first mobile device may also act as or be the selection device.

In one aspect, the rendering system may map the physical orientation/position of the selection device with a physical orientation/position of a virtual selection element in the virtual environment. Such mapping can be performed in any suitable manner. For example, the rendering system may map the initial GPS coordinates, accelerometer information, and other sensor information received from the selection device to an initial virtual position or orientation of the virtual selection element. As another example, the sensors of the motion capture system may determine the initial location of the selection device by detecting the infrared reflective markers on the selection device. The initial location may be mapped to an initial virtual position or orientation of the virtual selection element. As will be described below, any change in the initial physical orientation/position of the selection device may cause movement of the virtual selection element in the virtual environment.

In one embodiment, the virtual selection element may be represented by one or more visible rays or beams cast or emanating from the position of a virtual camera of the virtual environment. In some instances, the one or more rays may terminate or end once intersecting with or "hitting" the surface of an object in the virtual environment. The intersecting object may be considered to be currently "selected" by the representative system. In certain embodiments, the end or terminus of the virtual selection element may be represented by and/or include a target or "bulls-eye." The virtual selection element may also be associated with one or more displayed attributes for the surface with which it currently intersects. The attribute information may include information regarding the material of the surface, the density of the surface, the texture of the surface, the color of the surface, the virtual distance of the surface from the virtual camera of the virtual environment, etc. In some instances, a user may interact with the selection device to change the attributes of the surface in real-time or at interactive frame rates. For example, a user may interact with the selection device to change the attribute of the intersecting/selected virtual surface from a "wood" material to a "metal" material. Upon changing a surface from a wood material to a metal material, images of the virtual surface displayed to the user may be updated at interactive frames rates (e.g., 30, 60, 90, or 120 frames per second) accordingly to include a silver, shiny surface.

In some instances, the user may interact with the selection device to choose a virtual object to be placed on a selected surface. For example, a user may enter into an object placement menu or use predefined hotkeys to select and place a virtual tree or building on a surface currently selected by the virtual selection element. In some instances, the user may move or remove a virtual object from the virtual environment. For example, a user may select a virtual tree using the virtual section element and move the virtual tree to another location in the virtual environment by physically moving the selection device (as will be discussed below).

In some instances the virtual objects of the virtual environment may move or interact with other objects over time. In one aspect, the movement or interaction of the virtual objects may have been pre-rendered and/or pre-defined such that the virtual objects can be presented in very high fidelity. In other aspects, the movement and/or interactions of the virtual objects may be rendered in real-time.

In some instances, a user may move the virtual selection element by physically moving the selection device in the real world environment. As mentioned, the physical orientation of the selection device may be mapped to the orientation of the virtual selection element in the virtual environment. Thus, if the selection device moves three feet to the right in the physical world, the virtual selection element may also move three virtual feet to the right in the virtual world. In this way, a user can quickly select different objects within the virtual environment and determine the attributes of the objects. A user can also quickly add, remove, or move objects around the virtual environment.

In some embodiments, upon selecting an object as described herein, a user can interact with the selection device to "teleport" or be moved within a threshold vicinity of a selected object. For example, a user may interact with the selection device to select an object that is 40 virtual feet away from the current location of the virtual camera. The user may then indicate via the selection device (e.g., by pressing on a button of the selection device) to move to the location of the selected object. In response, the rendering system may move the virtual camera to the location of the object or a certain threshold distance away from the object (e.g., 2 feet away). In this way, a user can quickly move around a virtual environment.

Figure 13A:
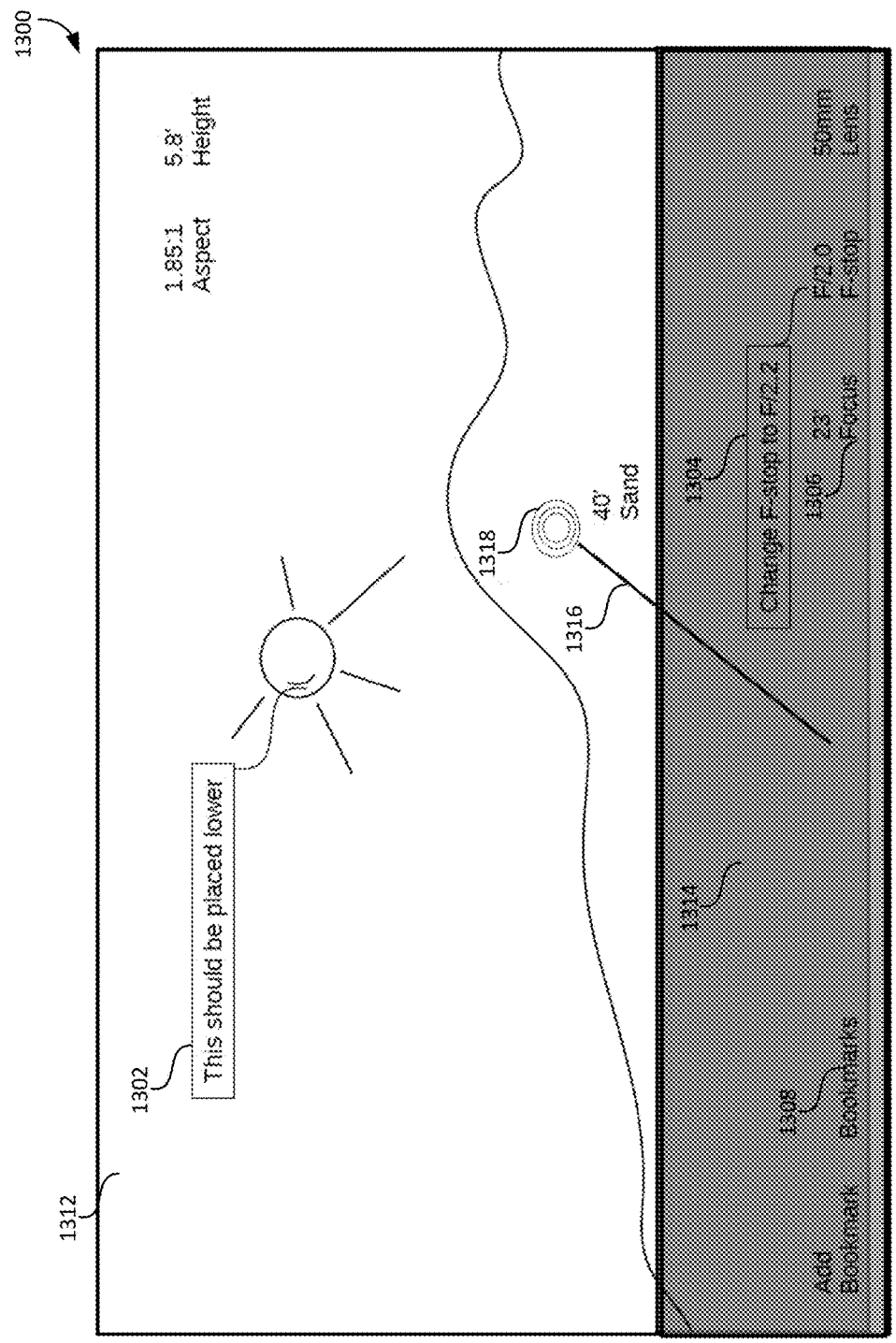
FIG. 13A illustrates an example user interface, according to some embodiments.

FIG. 13A illustrates an example user interface 1300. In particular, FIG. 13A includes the indicator 106 showing the current focus distance value. FIG. 13A also includes the indicator 1308 with which a user can interact in order to access any previously saved bookmarks. FIG. 13A further shows the annotations 1304 and 1302 that are associated with the particular shot. It should also be appreciated that the image frames presented to the user include cropped out areas 1312 and 1314. FIG. 13A further shows a virtual selection element 1316. The virtual selection element 1316 includes a ray portion that is cast out from the virtual camera and a target element 1318 indicating the surface with which the virtual selection element first intersects. In some embodiments, the virtual selection element may only terminate at a surface that is of a particular type. For example, the virtual selection element may not end (or be considered to intersect) with surfaces that have a less than a threshold density or are defined as having a gaseous or liquid type. For instance, the virtual selection element may not end (or be considered to intersect) a virtual cloud since the virtual cloud may not meet a predefined threshold density. Referring again to FIG. 13A, the virtual selection element 1316 is further associated with attribute information for a currently selected surface. In particular, the attribute information indicates that the selected surface (the surface of a dune) is 40 feet away and has a "sand" material type.

Figure 13B:
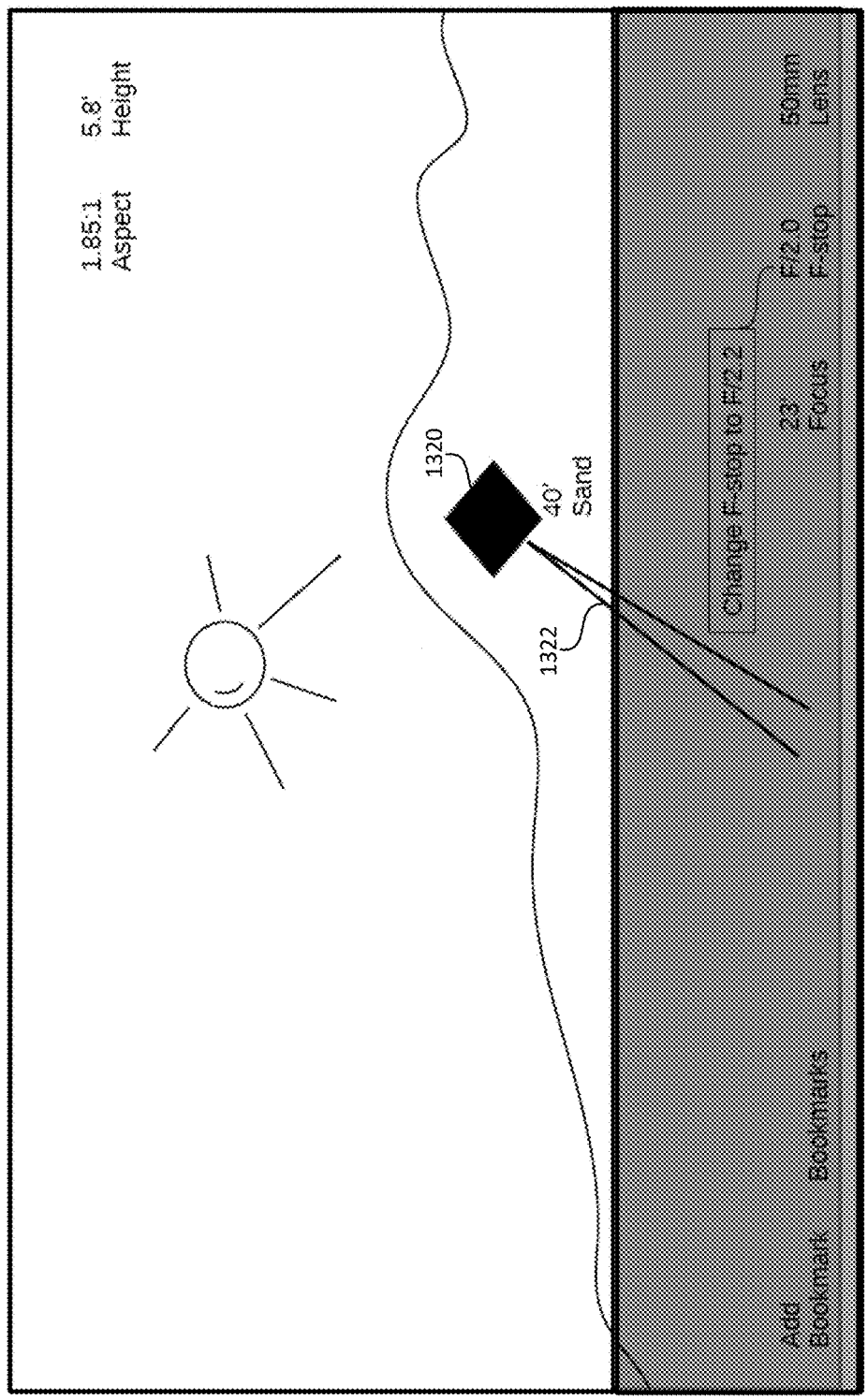
FIG. 13B illustrates an example user interface 1324 similar to that shown in FIG. 13A, according to some embodiments.

FIG. 13B illustrates an example user interface 1324 similar to that shown in FIG. 13A. FIG. 13B shows a virtual selection element 1322 with multiple rays. At the end of the rays is an object 1320 that will be placed on the surface that currently intersects with the virtual selection element 1322.

In some embodiments, the user can use the selection device to change the scale of the virtual camera. For example, the user can change the scale of the virtual camera such that the virtual environment can appear very large. Put another way, the user can shrink the virtual camera such that it appears the user is an insect within the virtual environment. In this way, the user can examine detailed aspects of the environment. As another example, the user can change the scale of the virtual camera such that the virtual environment appears very small. Put another way, the user can enlarge the virtual camera such that it appears that the user is a giant within the virtual environment. In this way, the user can easily examine the entirety of the virtual environment. In one embodiment, the user can navigate the virtual environment according to or based on the camera's virtual size. For example, "smaller" virtual cameras may move slower or have smaller "steps" across the virtual environment. "Larger" virtual camera may move faster or have "larger steps" across the same virtual environment.

In another embodiment, the virtual environment may be presented to a user in an immersive system. The user may have a selection device (e.g., smartphone, tablet, device with infrared reflective markers, etc.) that is tracked by the immersive system after an initial mapping. The tracking of the selection device may enable a user to select various objects within the virtual environment by pointing the selection device at various points of the projection device(s)

displaying the virtual environment. The user may further use the selection device to place various objects within the virtual environment.

In one aspect, the second mobile device may be a set of virtual reality goggles. In the aspect, the user may switch to an "immersive" mode during a session. As such, the rendering system may begin sending rendered image frames of the 3D virtual environment to the second mobile device and cease sending rendered image frames to the first mobile device. The rendering system may also change the format of the image frames that it renders so that it can be properly displayed by the second mobile device. In one aspect, the first mobile device may still be used to control the virtual camera. For example, the user may use any number of gestures to move the virtual camera via the first mobile device while viewing the image frames of the 3D virtual environment from the second mobile device. Note that no images may be presented over the display (e.g., touchscreen) of the first mobile device. In some embodiments, the user may briefly tap on the input device (e.g., touchscreen) of the first mobile device. In response to the tap, an indicator may be quickly presented or "flashed" in the image frames of the 3D virtual environment presented via the display of the second mobile device. The indicator or "flash" may indicate the portion of the 3D virtual environment corresponding to the portion of the input device of the first mobile device tapped by the user. In this way, the user is able to quickly determine the mapping between the first mobile device's input device and the second mobile device's display. In some instances, the first mobile device may act as the selection device for selecting objects within the virtual environment.

In yet another aspect, a third mobile device of an assisting operator may be used to control the virtual camera shown via the second mobile device (or first mobile device) to the user. For example, the third mobile device may display an overhead or map view of the 3D virtual environment. The assisting operator may interact with the third mobile device to move the virtual camera of the second or first mobile device to different locations within the 3D virtual environment. As such, the perspective of the 3D virtual environment shown to the user may be changed based on the input provided through the third mobile device.

In one aspect, the assisting operator may move the virtual camera of the user by tapping on different portions of the display of the third mobile device representative of different parts of the 3D virtual environment. As a result of the tapping, the virtual camera of the user may be "teleported" to the selected portions of the 3D virtual environment. As a result, the perspective of the virtual camera shown to the user over the first or second mobile device may be immediately changed from one portion of the 3D virtual environment to another. For example, the user may first view a mountain in the northwest part of the 3D virtual environment at a first time. Based on the interaction of the assisting operator with the third mobile device, the user may then view a lake in the southwest part of the 3D virtual environment at a second time. In another embodiment, the virtual camera of the first or second mobile device may be moved by the assisting operator based on the assisting operator's gestures input to the third mobile device. In one aspect, the speed at which the virtual camera of the user is moved from one part of the 3D virtual environment to another part of the 3D virtual environment may be based on the speed at which the finger of the assisting operator is moved over the input device (e.g., touchscreen) of the third mobile device. For example, the faster the assisting operator's finger is moved across a touchscreen of the third mobile device, the quicker the virtual camera of the second or first mobile device is moved across the 3D virtual environment. In this way, the user can be provided with a sense of actually moving through the 3D virtual environment rather than being teleported from location to location.

In yet another embodiment, a digital model within the 3D virtual environment may be mapped to the performance of an actor being captured by the motion capture system in a performance area. In particular, a set of sensors of the motion capture system may track the actor based on, for example, a motion capture suit worn by the actor. The actor's performance may then be used to move the digital model in the 3D virtual environment in real-time or at interactive frame rates. The digital model may move while the user of the first mobile device/second mobile device is viewing and/or moving the virtual camera within the 3D virtual environment.

In one embodiment, the bookmarks created by the user may be exported or otherwise provided to the content creation system. An artist operating the content creation system may select the bookmarks (which may be sorted by rating) in order to load a virtual camera in the 3D virtual environment from a position and orientation indicated by the bookmark. The virtual camera may also be loaded with a lens type, focus, crop-factor, and/or f-stop indicated by the bookmark. In this way, the artist can easily begin processing a scene in order to generate an item of content.

In one embodiment, the second mobile device (if it is a pair of VR glasses or goggles, for example), may present a split screen to a user. One side of the screen may display video of the physical environment as captured by a front facing camera associated with the second mobile device. The other side may show the virtual environment. In this way, the user can simultaneously view the virtual environment while being able to also avoid obstacles in the physical environment as the user moves. In another embodiment, a picture-in-picture organization may be used rather than a split screen. For example, the primary screen may display the virtual environment. A smaller secondary screen may be overlaid on the primary screen and show the physical environment as captured by the front-facing camera associated with the second mobile device.

Figure 14:
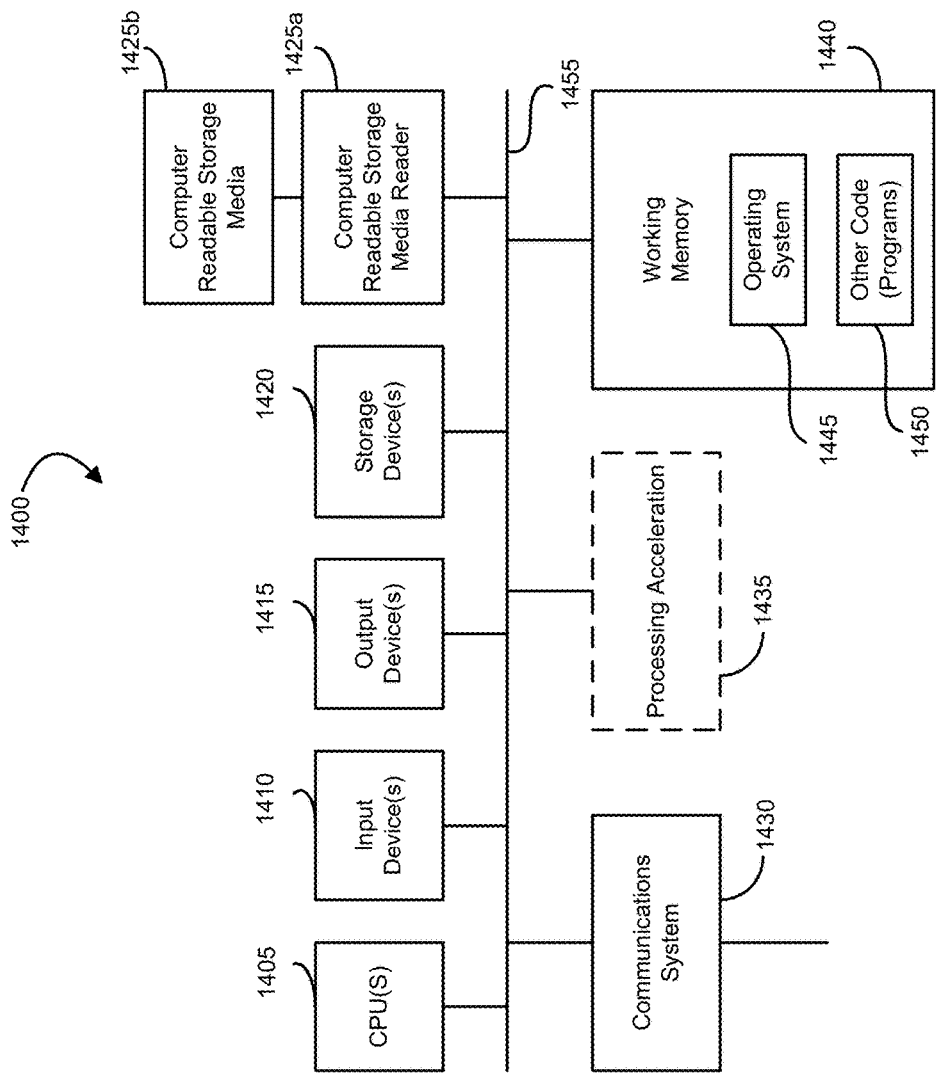
FIG. 14 illustrates an exemplary computer system, in which parts of various embodiments of the present invention may be implemented.

Each of the embodiments disclosed herein may be implemented in a special-purpose or a general-purpose computer system. FIG. 14 illustrates an exemplary computer system 1400, in which parts of various embodiments of the present invention may be implemented. The system 1400 may be used to implement any of the computer systems described above. The computer system 1400 is shown comprising hardware elements that may be electrically coupled via a bus 1455. The hardware elements may include one or more central processing units (CPUs) 1405, one or more input devices 1410 (e.g., a mouse, a keyboard, etc.), and one or more output devices 1415 (e.g., a display device, a printer, etc.). The computer system 1400 may also include one or more storage device 1420. By way of example, storage device(s) 1420 may be disk drives, optical storage devices, solid-state storage device such as a random access memory ("RAM") and/or a read-only memory ("ROM"), which can be programmable, flash-updateable and/or the like.

The computer system 1400 may additionally include a computer-readable storage media reader 1425a, a communications system 1430 (e.g., a modem, a network card (wireless or wired), an infra-red communication device, etc.), and working memory 1440, which may include RAM and ROM devices as described above. In some embodiments, the computer system 1400 may also include a processing acceleration unit 1435, which can include a DSP, a special-purpose processor, a Graphic Processing Unit (GPU), and/or the like.

The computer-readable storage media reader 1425a can further be connected to a computer-readable storage medium 1425b, together (and, optionally, in combination with storage device(s) 1420) comprehensively representing remote, local, fixed, and/or removable storage devices plus storage media for temporarily and/or more permanently containing computer-readable information. The communications system 1430 may permit data to be exchanged with the network 1420 and/or any other computer described above with respect to the system 1400.

The computer system 1400 may also comprise software elements, shown as being currently located within a working memory 1440, including an operating system 1445 and/or other code 1450, such as an application program (which may be a client application, web browser, mid-tier application, RDBMS, etc.). It should be appreciated that alternate embodiments of a computer system 1400 may have numerous variations from that described above. For example, customized hardware might also be used and/or particular elements might be implemented in hardware, software (including portable software, such as applets), or both. Further, connection to other computing devices such as network input/output devices may be employed. Software of computer system 1400 may include code 1450 for implementing embodiments of the present invention as described herein.

Each of the methods described herein may be implemented by a computer system, such as computer system 1400 in FIG. 14. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computer without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A computer-implemented method comprising:
 causing first content to be displayed on a display device;
 determining a location of a mobile device relative to the display device, wherein the mobile device is positioned such that the first content is visible to a viewer of the mobile device;
 causing second content to be rendered by a rendering engine based on the location of the mobile device relative to the display device; and
 causing the second content to be displayed on the mobile device such that the second content is layered over the first content, wherein the second content is stretched or compressed in a vertical aspect based on a distance between the mobile device and the display device while maintaining a horizontal aspect.

2. The computer-implemented method of claim 1, further comprising:
 determining dimensions of the display device; and
 generating or altering a displayed size of the second content based at least in part on the dimensions of the display device and the location of the mobile device.

3. The computer-implemented method of claim 1, further comprising:
 determining an orientation of the mobile device relative to the display device; and
 generating or altering the second content based at least in part on the orientation of the mobile device.

4. The computer-implemented method of claim 1, wherein:
 the mobile device comprises a pair of augmented-reality (AR) glasses worn by the viewer;
 the display device comprises a theater screen in a movie theater; and
 the first content comprises a movie.

5. The computer-implemented method of claim 1, wherein:
 a blur effect is applied to the first content; and
 the blur effect is not applied to the second content.

6. The computer-implemented method of claim 1, further comprising:
 determining a location of a second mobile device relative to the display device, wherein the second mobile device is positioned such that the first content is visible to a viewer of the second mobile device; and
 causing third content to be displayed on the second mobile device such that the third content is layered over the first content.

7. The computer-implemented method of claim 6, wherein:
 the second content comprises an object;
 the third content comprises the object;
 when viewed through the mobile device, the object appears at a first location relative to the display device; and when viewed through the second mobile device, the object appears at the first location relative to the display device.

8. The computer-implemented method of claim 6, wherein:
the second content comprises an object;
the third content comprises the object;
when viewed through the mobile device, the object appears at a first location relative to the display device;
when viewed through the second mobile device, the object appears at a second location relative to the display device; and
the second location relative to the display device is different from the first location relative to the display device.

9. The computer-implemented method of claim 6, wherein:
the second content comprises an object following a first motion path;
the third content comprises the object following a second motion path;
the first motion path is different from the second motion path relative to the display device; and
the first motion path when viewed through the mobile device is the same as the second motion path when viewed through the second mobile device.

10. The computer-implemented method of claim 9, further comprising:
receiving a first input from the mobile device; and
receiving a second input from the second mobile device, wherein:
the second input is received after the first input is received;
the object begins following the first motion path based on when the first input is received; and
the object begins following the second motion path based on when the second input is received.

11. A non-transitory, computer-readable medium comprising instructions that, when executed by one or more processors, cause the one or more processors to perform operations comprising:
causing first content to be displayed on a display device;
determining a location of a mobile device relative to the display device, wherein the mobile device is positioned such that the first content is visible to a viewer of the mobile device; and
causing second content to be rendered by a rendering engine based on the location of the mobile device relative to the display device; and
causing the second content to be displayed on the mobile device such that the second content is layered over the first content, wherein the second content is stretched or compressed in a vertical aspect based on a distance between the mobile device and the display device while maintaining a horizontal aspect.

12. The non-transitory, computer-readable medium of claim 11, comprising additional instructions that cause the one or more processors to perform additional operations comprising:
determining dimensions of the display device; and
generating or altering a displayed size of the second content based at least in part on the dimensions of the display device and the location of the mobile device.

13. The non-transitory, computer-readable medium of claim 11, comprising additional instructions that cause the one or more processors to perform additional operations comprising:
determining an orientation of the mobile device relative to the display device; and
generating or altering the second content based at least in part on the orientation of the mobile device.

14. The non-transitory, computer-readable medium of claim 11, wherein:
the mobile device comprises a pair of augmented-reality (AR) glasses worn by the viewer;
the display device comprises a theater screen in a movie theater; and
the first content comprises a movie.

15. The non-transitory, computer-readable medium of claim 11, wherein:
a blur effect is applied to the first content; and
the blur effect is not applied to the second content.

16. A system comprising:
one or more processors;
one or more memory devices comprising instructions that, when executed by the one or more processors, cause the one or more processors to perform operations comprising:
causing first content to be displayed on a display device;
determining a location of a mobile device relative to the display device, wherein the mobile device is positioned such that the first content is visible to a viewer of the mobile device; and
causing second content to be rendered by a rendering engine based on the location of the mobile device relative to the display device; and
causing the second content to be displayed on the mobile device such that the second content is layered over the first content, wherein the second content is stretched or compressed in a vertical aspect based on a distance between the mobile device and the display device while maintaining a horizontal aspect.

17. The system of claim 16, wherein the one or more memory devices comprises additional instructions that cause the one or more processors to perform additional operations comprising:
determining a location of a second mobile device relative to the display device, wherein the second mobile device is positioned such that the first content is visible to a viewer of the second mobile device; and
causing third content to be displayed on the second mobile device such that the third content is layered over the first content.

18. The system of claim 17, wherein:
the second content comprises an object;
the third content comprises the object;
when viewed through the mobile device, the object appears at a first location relative to the display device; and
when viewed through the second mobile device, the object appears at the first location relative to the display device.

19. The system of claim 17, wherein:
the second content comprises an object;
the third content comprises the object;
when viewed through the mobile device, the object appears at a first location relative to the display device;
when viewed through the second mobile device, the object appears at a second location relative to the display device; and
the second location relative to the display device is different from the first location relative to the display device.

20. The system of claim 17, wherein:
the second content comprises an object following a first motion path;
the third content comprises the object following a second motion path;
the first motion path is different from the second motion path relative to the display device; and
the first motion path when viewed through the mobile device is the same as the second motion path when viewed through the second mobile device.

* * * * *